United States Patent
Barth

(10) Patent No.: US 7,483,617 B2
(45) Date of Patent: Jan. 27, 2009

(54) UNDERGROUND ENCLOSURE MOUNTING SYSTEM

(75) Inventor: Michael Barth, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/008,924

(22) Filed: Jan. 14, 2008

(65) Prior Publication Data
US 2008/0240665 A1 Oct. 2, 2008

Related U.S. Application Data

(62) Division of application No. 11/137,117, filed on May 25, 2005, now Pat. No. 7,330,625.

(51) Int. Cl.
*G02B 6/00* (2006.01)
(52) U.S. Cl. ........................... 385/135; 385/134
(58) Field of Classification Search ................. 385/134, 385/135, 136, 137, 138, 53.95, 96
See application file for complete search history.

(56) References Cited

U.S. PATENT DOCUMENTS

| | | | | |
|---|---|---|---|---|
| 2,247,936 | A | | 7/1941 | Bishop ...................... 174/17 R |
| 4,776,138 | A | * | 10/1988 | Sumner et al. ................. 52/20 |
| 5,189,723 | A | | 2/1993 | Johnson et al. ............. 385/134 |
| 5,274,731 | A | | 12/1993 | White ........................ 385/135 |
| 5,497,444 | A | | 3/1996 | Wheeler ..................... 385/135 |
| 5,653,559 | A | | 8/1997 | Stieb et al. .................. 405/303 |
| 5,717,810 | A | | 2/1998 | Wheeler ..................... 385/135 |
| 5,734,776 | A | | 3/1998 | Puetz ......................... 385/134 |
| 5,758,003 | A | | 5/1998 | Wheeler et al. ............. 385/134 |
| 6,532,332 | B2 | | 3/2003 | Solheid et al. ............. 385/134 |
| 6,591,051 | B2 | | 7/2003 | Solheid et al. ............. 385/134 |
| 7,190,874 | B1 | * | 3/2007 | Barth et al. ................. 385/135 |
| 7,313,311 | B1 | * | 12/2007 | Benbow ..................... 385/134 |
| 7,327,926 | B2 | * | 2/2008 | Barth et al. ................. 385/135 |
| 7,330,625 | B2 | * | 2/2008 | Barth ......................... 385/135 |

(Continued)

FOREIGN PATENT DOCUMENTS

EP 0 908 994 A1 4/1999

(Continued)

OTHER PUBLICATIONS

U.S. Appl. No. 11/138,063, filed May 25, 2005 entitled "Fiber Optic Splitter Module," 60 pages.

(Continued)

*Primary Examiner*—Brian M Healy
(74) *Attorney, Agent, or Firm*—Merchant & Gould P.C.

(57) ABSTRACT

A mounting fixture for mounting a piece of telecommunications equipment within an underground vault is disclosed. The mounting fixture includes a frame structure configured to be mounted to an upper edge of an open end of a vault. The mounting fixture also includes a can structure for receiving the piece of telecommunications equipment. The can structure includes a closed end, an open end, and a sidewall extending between the closed end and the open end, the can structure being mounted to the frame structure. A cover including a top end and a skirt portion extending downwardly from the top end is slidably received within the can structure, the skirt portion sized to fit around the piece of telecommunications equipment and sized to fit within the sidewall of the can structure, the top end of the cover forming a water tight seal with the top end of the can structure.

7 Claims, 29 Drawing Sheets

U.S. PATENT DOCUMENTS

| | | | | |
|---|---|---|---|---|
| 2002/0166724 | A1 | 11/2002 | Kvam | 182/129 |
| 2005/0130621 | A1* | 6/2005 | Flynn | 455/347 |
| 2006/0093301 | A1 | 5/2006 | Zimmel et al. | 385/135 |
| 2006/0127028 | A1 | 6/2006 | Beck | 385/139 |
| 2006/0278426 | A1* | 12/2006 | Barth | 174/135 |

OTHER PUBLICATIONS

U.S. Appl. No. 11/138,667, filed May 25, 2005 entitled "Fiber Service Blocker," 30 pages.

U.S. Appl. No. 11/138,889, filed May 25, 2005 entitled "Fiber Optic Adapter Module," 57 pages.

"Outside Plant Cross-Connect Solutions," *ADC Telecommunications, Inc.*, pp. 339-341 (Jun. 2004).

"Outside Plant FiberSeal System 96 Installation Instructions," *ADC Telecommunications, Inc.*, ADCP-93-079, Issue 3, pp. 1-25 (Aug. 2000).

"Radiator II. Above Ground HDSLx 16-Slot Repeater Housing," *ADC Telecommunications, Inc.*, 2 pages (Nov. 2004).

"Radiator II. Below Ground HDSLx 8-Slot Repeater Housing," *ADC Telecommunications, Inc.*, 2 pages (Jan. 2004).

"Radiator II 8-Slot Repeater Housing User Manual," *ADC Telecommunications, Inc.*, pp. i-viii, 1-20 (Jan. 14, 2004).

* cited by examiner

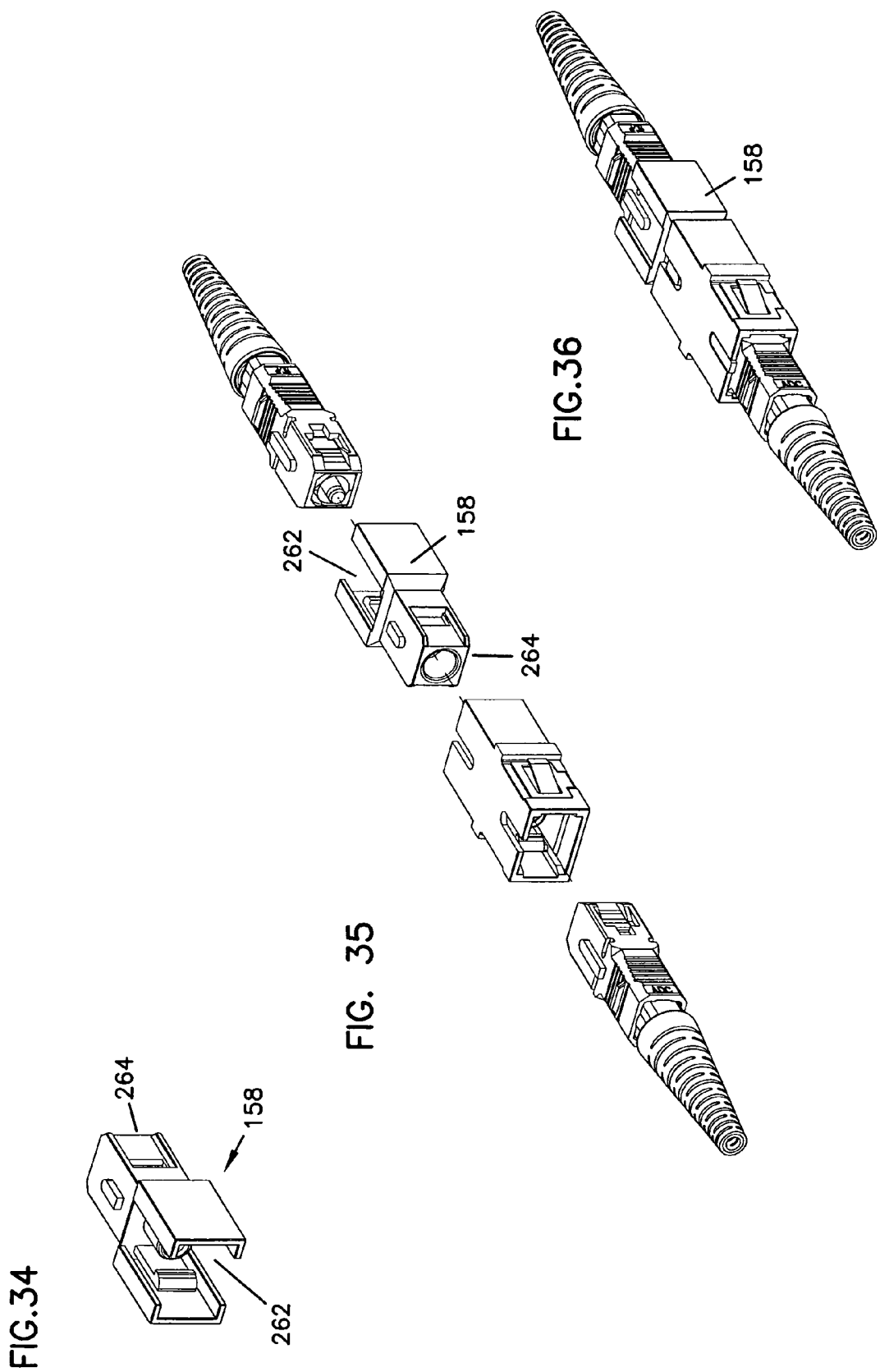

UNDERGROUND ENCLOSURE MOUNTING SYSTEM

CROSS REFERENCE TO RELATED APPLICATION

This application is a divisional of application Ser. No. 11/137,117, filed May 25, 2005, now U.S. Pat. No. 7,330,625 which application is incorporated herein by reference.

FIELD

The present invention relates generally to provision of optical fiber telecommunications service. More specifically, the present invention relates to packaging of a fiber distribution system.

BACKGROUND

Outside plant (OSP) telecommunications equipment, including terminations and splitters, may be housed in protective enclosures out of doors. The enclosures may be above-ground. Below-ground solutions are known which store the equipment in a below-ground vault. The vault is typically accessible through a top door.

As demand for telecommunications services increases, optical fiber services are being extended into more and more areas. Often, it is more cost effective to provide for greater service capacity than current demand warrants. This will allow a telecommunications service provider to quickly and cost-effectively respond to future growth in demand. Often, optical fiber cables may be extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service.

Therefore, it is desirable to have an easily scalable solution for aiding connection of new customers to existing connections within a piece of installed connection equipment and expansion of the number of connections available within the installed equipment. It is also desirable to provide for a scalable connection solution that can provide for a high density of connections while using little space, that limits visual pollution, and that is reliable and easy to service. In the case of below-ground vault storage, it is desirable that the equipment be readily accessible as needed by the service technician.

SUMMARY

The present invention relates to a fiber optic telecommunications distribution system and the packaging thereof. The fiber optic telecommunications distribution system includes a packaging structure that allows for radial positioning of a plurality of splitter modules to provide a high-density packaging system. The fiber optic telecommunications distribution system also includes radially arranged adapter modules each with an array of adapters for optically connecting two fiber optic cables terminated with connectors.

In one embodiment, the adapter modules may be placed directly underneath the splitter modules. Arranging the splitter modules and the adapter modules in a circular fashion allows the distance from the splitter module outputs to the adapter modules to be essentially equal, therefore eliminating the need for excess slack cable and excess cable storage area. This arrangement, in turn, provides for a high density fiber distribution system that is small in size and weight, and allows for service access to the distribution system.

An outside plant cable is routed through the fiber distribution system wherein the splitter modules split the signal into a plurality of output cables. The plurality of output cables are directed to the adapter modules. Customer equipment cables are connected to the output cables through the adapter modules. For those customers who are currently not ready to accept and utilize fiber optic connectivity service, a removable service blocker may be used between the output cables and the customer equipment cables for blocking illumination.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 34 shows a perspective view of a service blocking structure adapted for use with the fiber optic telecommunications distribution system of FIGS. 1-33, the service blocker being adapted for blocking the fiber optic signal between an outside plant cable and a customer equipment cable;

FIG. 35 is an exploded view showing an adapter, two fiber optic connectors, and the service blocker of FIG. 34 positioned between one of the connectors and the adapter;

FIG. 36 is a perspective view showing the adapter, the two fiber optic connectors, and the service blocker of FIG. 35 in an assembled configuration;

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
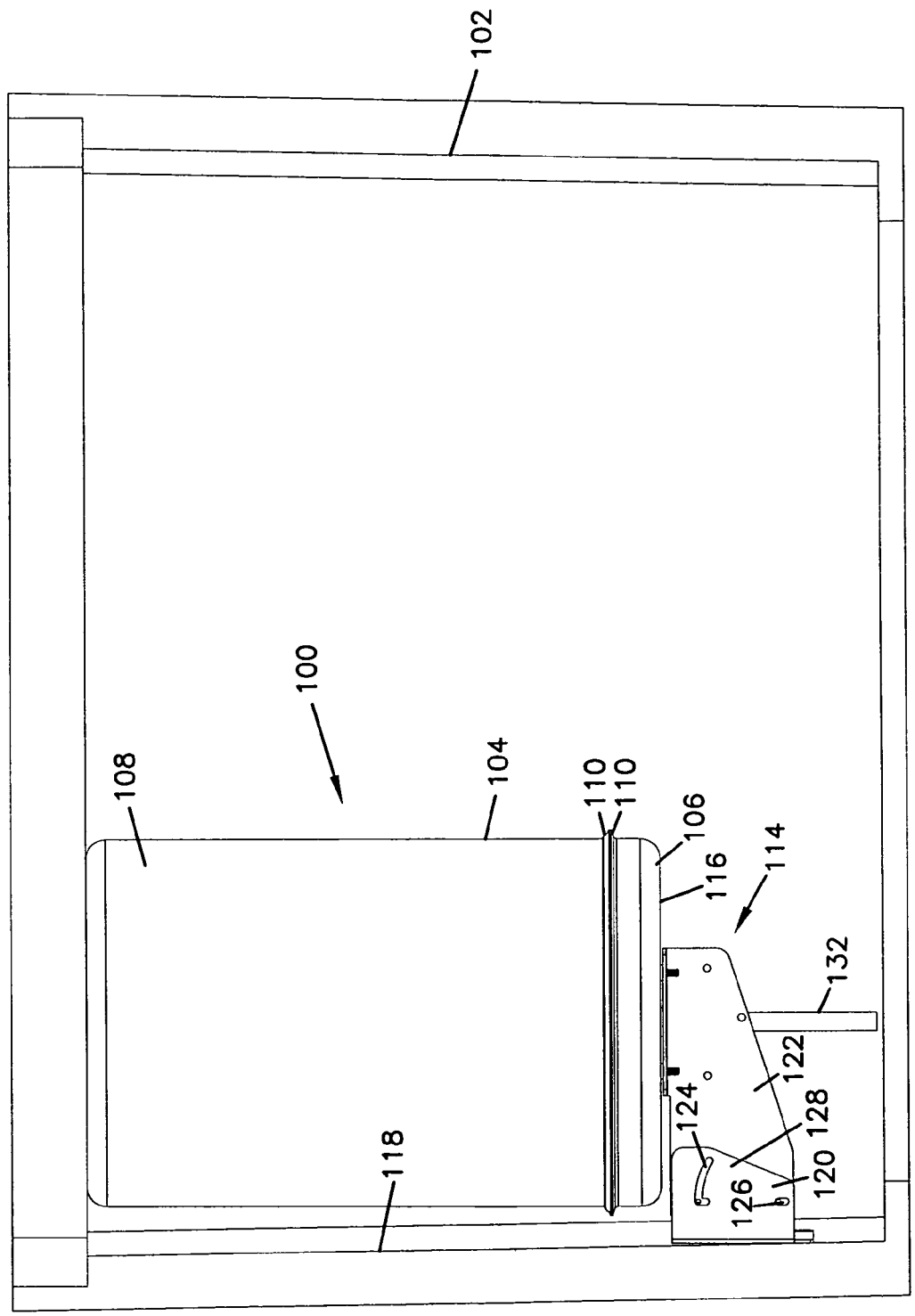
FIG. 1 is a side view of a fiber optic telecommunications distribution system, the system shown mounted to a sidewall of an underground vault.
Figure 2:
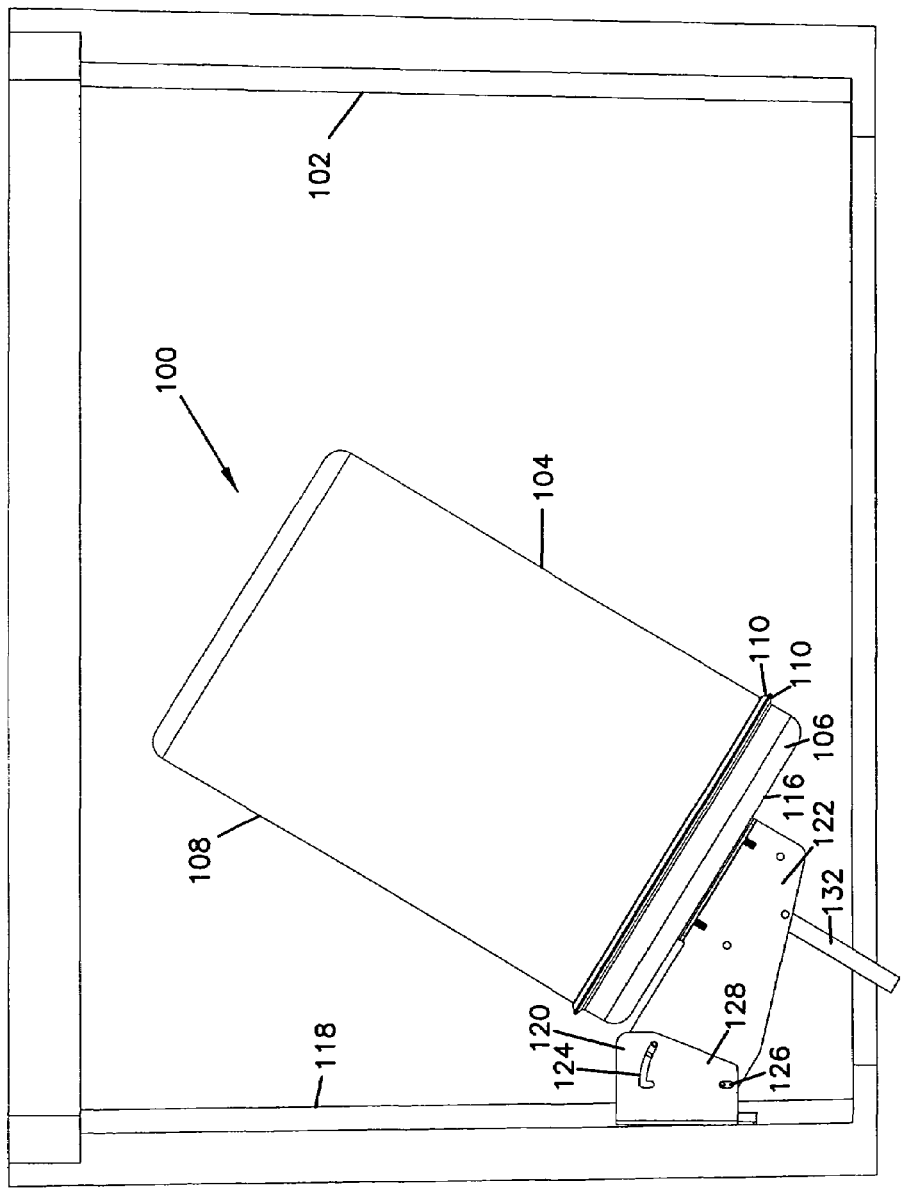
FIG. 2 is a side view of the fiber optic telecommunications distribution system of FIG. 1, with a mounting bracket of the system shown in a pivoted orientation for allowing access to parts of the system adjacent the sidewall of the vault.

Referring to FIGS. 1-2, a side view of a fiber optic telecommunications distribution system 100 having examples of inventive aspects in accordance with the present disclosure is shown mounted in an underground vault 102. The underground vault 102 might be located in an area where fiber optic connectivity for customers is desired. It should be appreciated that the inventive aspects of the disclosure are applicable to above-ground as well as below-ground applications.

The fiber optic telecommunications distribution system 100 is sealed by an enclosure 104 that is defined by a base tray 106 and a cover 108. As depicted, the base tray 106 and the cover 108 include mating abutting flanges 110 that are adapted for receiving a V-clamp 112 with an O-ring for forming a water-tight seal (see FIG. 3A). Such clamps are commonly known in the art. In this manner, any water that might be present in the underground vault 102 does not reach the inner components of the fiber optic telecommunications distribution system 100.

The base tray 106 of the enclosure 104 includes a mounting bracket 114 attached to a bottom side 116 of the base tray 106. The mounting bracket 114 is used to mount the enclosure 104 to a sidewall 118 of the underground vault 102. The mounting bracket 114 is formed from two interfitting U-shaped plates 120, 122 (see FIG. 2). The first U-shaped plate 120 is fixedly attached to the sidewall 118 of the underground vault 102, while the second U-shaped plate 122 is pivotably coupled to the first U-shaped plate 120. In the depicted embodiment, the second plate 122 is bolted to the bottom side 116 of the base tray 106. By providing pivotability, the mounting bracket 114 allows access to portions of the fiber optic telecommunications distribution system 100 that are adjacent to the sidewall 118 of the vault 102.

In the depicted embodiment, the second U-shaped plate 122 slides with respect to the first U-shaped plate 120 along a curved groove 124 and while pivoting about a hole 126 defined at a side 128 of the first plate 120. The groove 124 includes an L-shape to provide a locking feature for the mounting bracket 114 when the bracket 114 is in a non-pivoted orientation. To pivot the enclosure 104 from the non-pivoted position of FIG. 1 to the pivoted position of FIG. 2, the second plate 122 is lifted upwards to disengage the second plate 122 from the tip of the L-shaped groove 124 and then pivoted downwards about the hole 126. The hole 126 includes a slotted shape to accommodate for the locking/unlocking feature of the mounting bracket 114.

Figure 3:
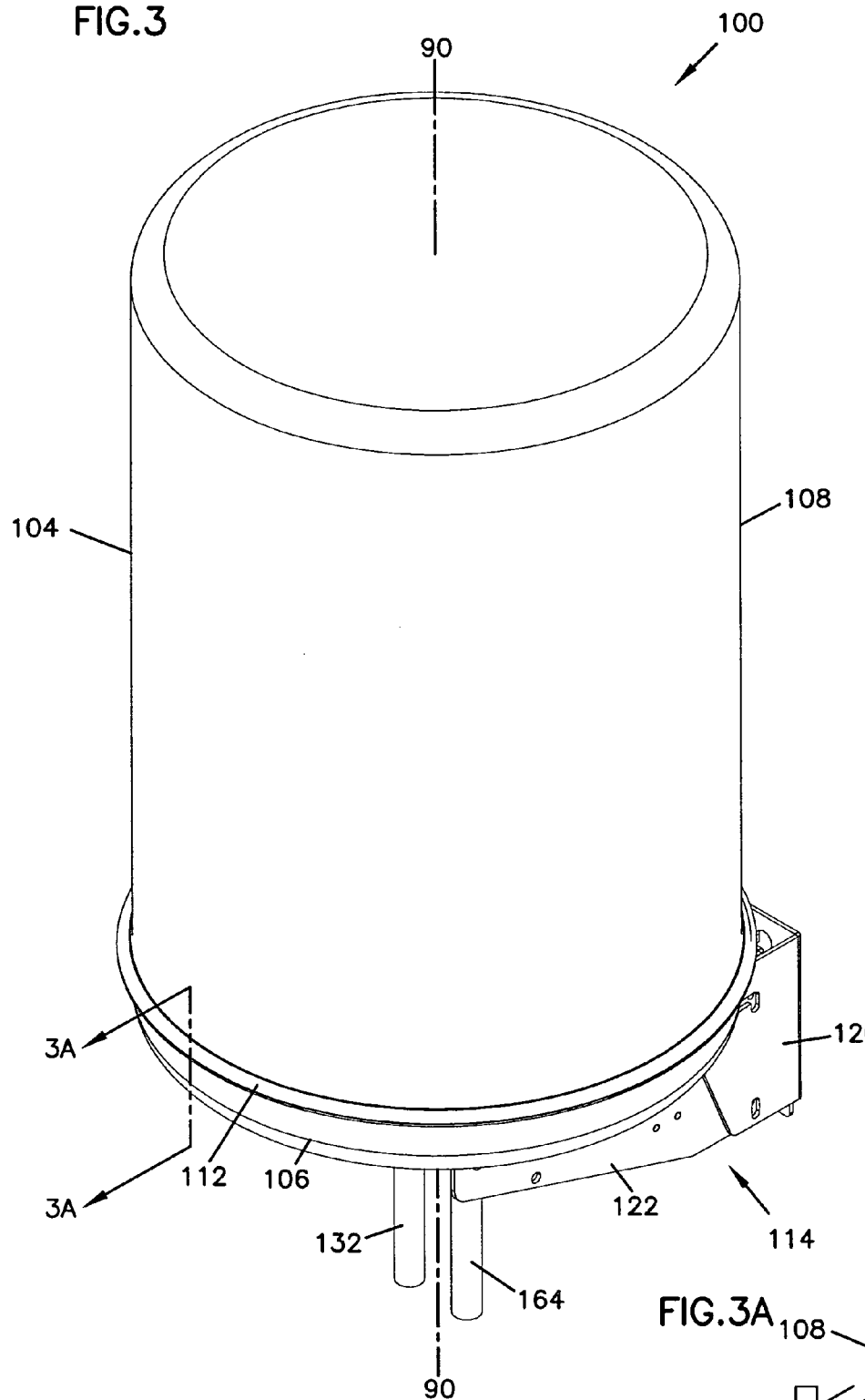
FIG. 3 is a perspective view of the fiber optic telecommunications distribution system of FIG. 1, the distribution system shown in a fully enclosed configuration.
Figure 3A:
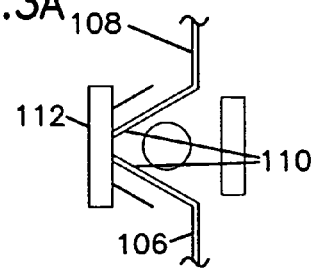
FIG. 3A is cross-sectional view taken along line 3A-3A of FIG. 3, with a V-clamp with an O-ring shown.

FIG. 3 illustrates the enclosure 104 of the fiber optic telecommunications distribution system 100. FIGS. 4-8 illustrate the fiber optic telecommunications distribution system 100 with the cover 108 of the enclosure 104 removed, exposing the inner components of the distribution system 100.

Referring generally to FIGS. 4-8, the fiber optic telecommunications distribution system 100 includes a plurality of radially arranged splitter modules 130. The splitter modules 130 split the optical signal of each cable of a multi-fiber cable 132 (i.e., outside plant cables or OSP cables or feeder cable) that enter the system 100 through the bottom 116 of the enclosure 104 and redistribute the signal through distribution cables 134.

System 100 includes fiber terminations between customer equipment distribution cables 134 and splitter outputs 138. Splitter outputs 138 and distribution cables 134 are terminated with connectors. The connectors are mated at adapters 220 in a lower portion of system 100. Mounted underneath the splitter modules 130 are two rows of radially arranged adapter modules 136 that are positioned between splitter outputs 138 and the customer equipment distribution cables 134. Adapter modules 136 hold the adapters 220 noted above. The fiber optic telecommunications distribution system 100 also includes radially arranged radius limiter/cable management structures 140 that are located between the splitter modules 130. As will be discussed in further detail below, the radius limiters 140 are configured to manage the cables 142 coming out of the outputs 138 of the splitter modules 130 and direct the cables 142 down to the adapter modules 136 for redistribution.

The fiber optic telecommunications distribution system 100 depicted in FIGS. 4-8 provides a packaging system that provides a scalable solution for aiding connection of new customers to existing connections within a piece of installed connection equipment and expansion of the number of connections available within the installed equipment. The fiber optic telecommunications distribution system 100 provides a location for outside plant fiber optic cables 132 to be connected to fiber optic distribution cables 134 (i.e. customer equipment cables). The distribution cables 134 are then led to customer equipment to provide fiber optic service and connectivity at the customer's location.

Figure 8:
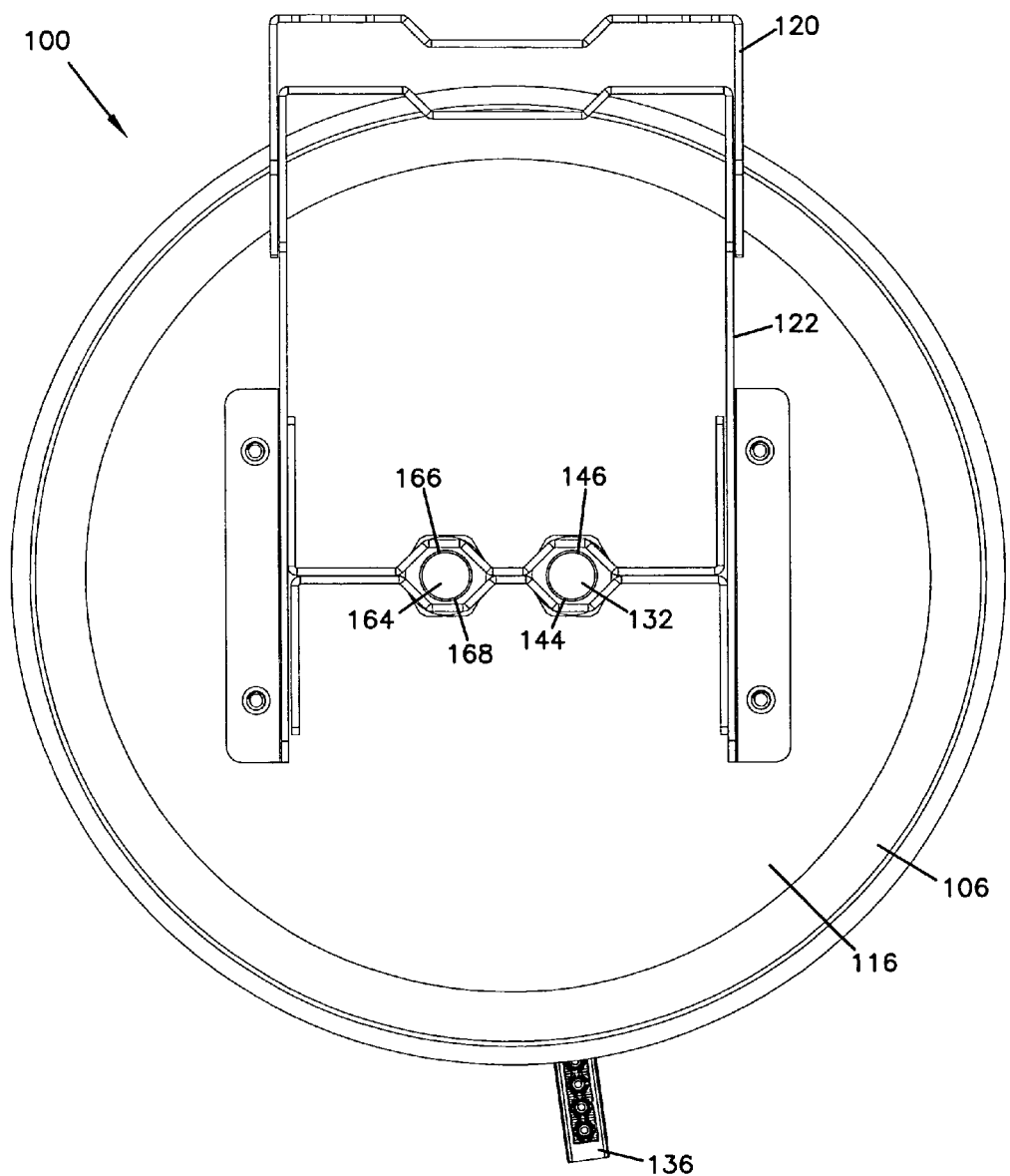
FIG. 8 is a bottom view of the fiber optic telecommunications distribution system of FIG. 4.

In the distribution system 100 shown in FIGS. 4-8, the outside plant multi-fiber cable 132 enters the distribution system 100 through an opening 144 at the bottom side 116 of the base tray 106 (shown in FIG. 8). Preferably, a sealing arrangement 146 is formed at the cable entry opening 144 at the bottom of the base tray 106. In one embodiment, the feeder cables 132 may be 12-cable ribbon cables with four ribbons, totaling forty-eight fibers. Individual fibers of the feeder cable 132 may then be fanned-out by fan-outs (not shown) and terminated to connectors. The connectors can then be connected to the radially arranged adapter assemblies 148 that are mounted on the radius limiters 140. In the illustrated embodiment, such cable terminating connectors and adapters are SC type connectors and adapters. It is anticipated that other types, formats, styles and sizes of telecommunications connectors and adapters may be used.

The adapter assemblies 148 also mate with input connectors 150 of the splitter modules 130. The splitter modules 130 split each signal into multiple signals and output cables 142 exit out of the outputs 138 of the splitter modules 130. The output cables 142 are also preferably terminated with connectors 152. The output cables 142 are routed over the cable management features 154 of the radius limiters 140 down to the two rows of radially arranged adapter modules 136. A plurality of distribution cables 134 terminated with connectors 156 can then be connected to opposing sides of the adapter modules 136 for providing signal to the customers.

For those customers who are currently not ready to accept and utilize fiber optic connectivity service, a removable service blocker 158 (see FIGS. 34-36) may be used between the splitter output cables 142 and the customer equipment cables 134 for blocking fiber optic signal.

Figure 11:
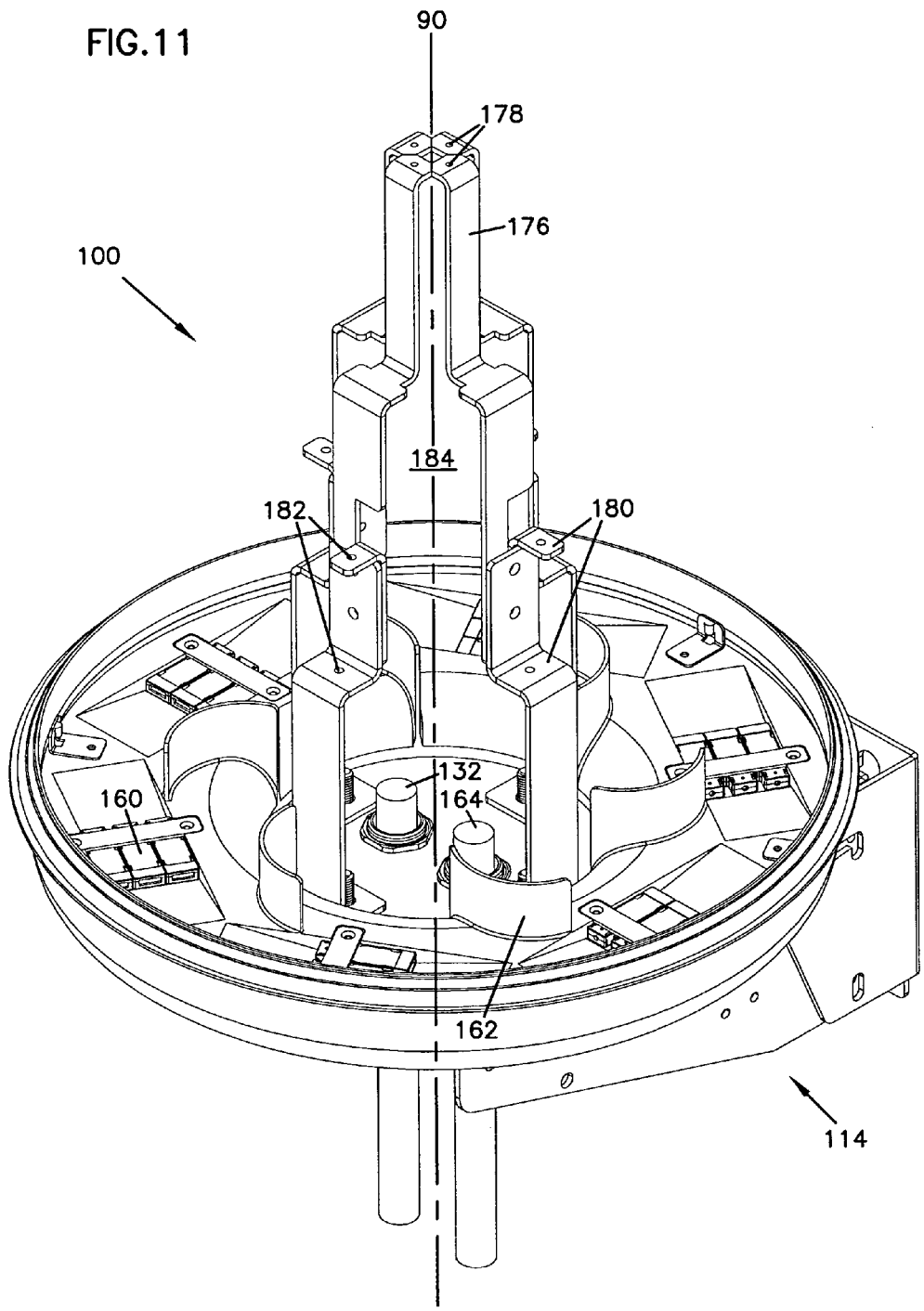
FIG. 11 is a perspective view of a center support structure of the fiber optic telecommunications distribution system of FIG. 9 and the base to which it is mounted, the center support structure shown with the splitter module mount and the adapter module mount removed from the system.

As shown in FIG. 11, located within the base tray 106 are fan-outs 160 and cable management structures 162. The distribution cables 134 coming out of the lower end of the adapters can be fanned out and put into ribbon cables. The outgoing ribbon cable is represented by reference numeral 164. The cable management structures 162 located within the tray 106 route the fanned-out cables 164 toward the center of the system. As with the feeder cable 132, outgoing cable 164 also forms a sealing arrangement 166 with a second opening 168 at the bottom side 116 of the base tray 106.

Arranging the splitter modules 130 and the adapter modules 136 in a circular fashion, preferably positioning the splitter outputs 138 toward the center 170 of the circle, allows the output cables 142 to be connected to the radially arranged adapter modules 136 with similar lengths of cables extending from each splitter module 130. With the distance from the splitter module outputs 138 to the adapter modules 136 being essentially equal, need for excess slack cable or excess cable storage space is eliminated. This arrangement, in turn, provides for a high density fiber distribution system that is small in size and weight and allowing for service access to the distribution system. The outputs 138 are located adjacent a central axis 90 of system 100. In the illustrated embodiment, the outputs 138 can be extended to any desired adapter module 136.

Providing a can/bell-jar type sealed enclosure 104 also prevents any water in the vault 102 from coming up to the splitter modules 130 due to trapped air within the enclosure 104.

Figure 9:
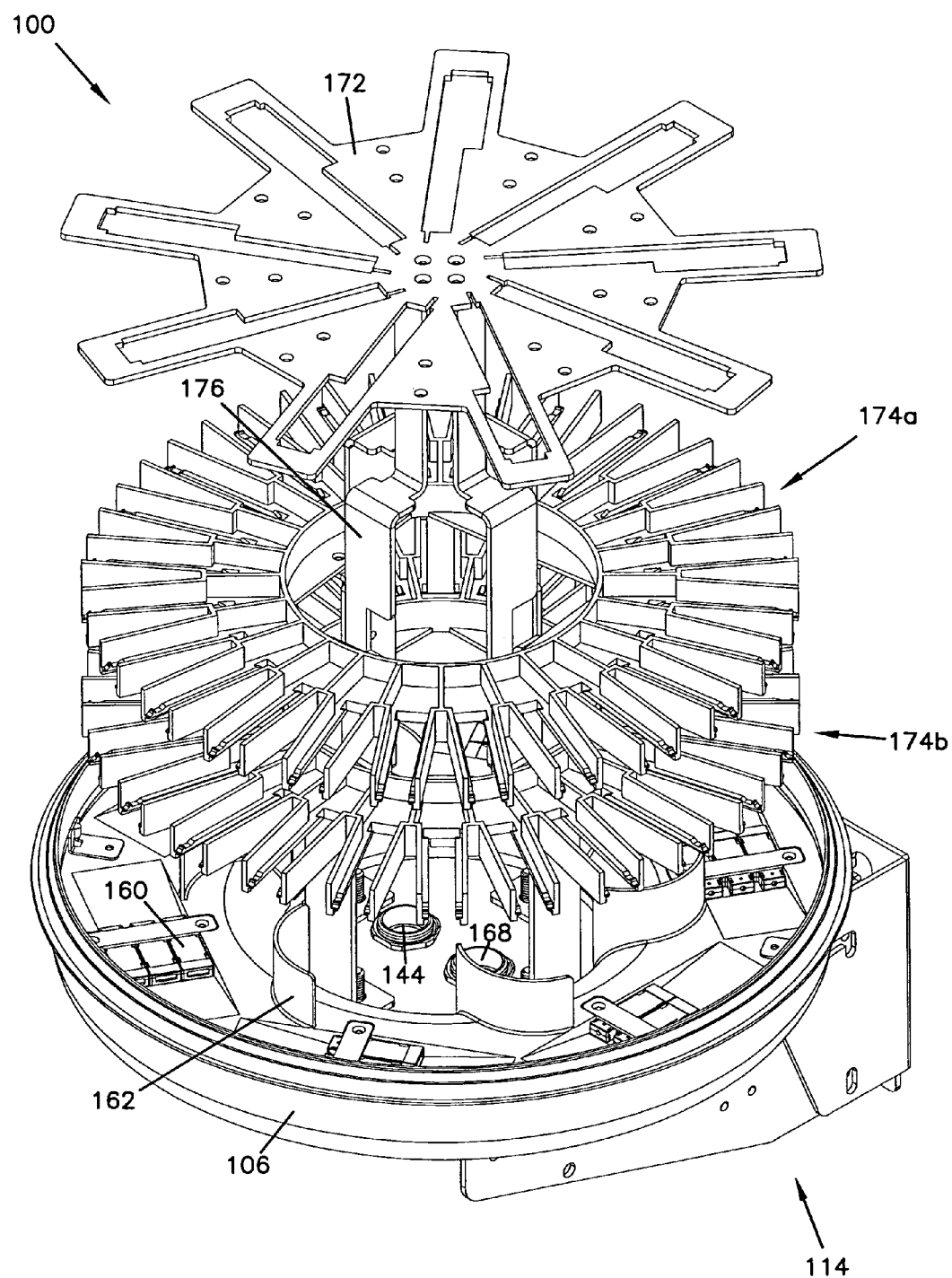
FIG. 9 is a perspective view of the fiber optic telecommunications distribution system of FIG. 4, shown with all splitter modules, adapter modules, and radius limiters removed from the system.
Figure 10:
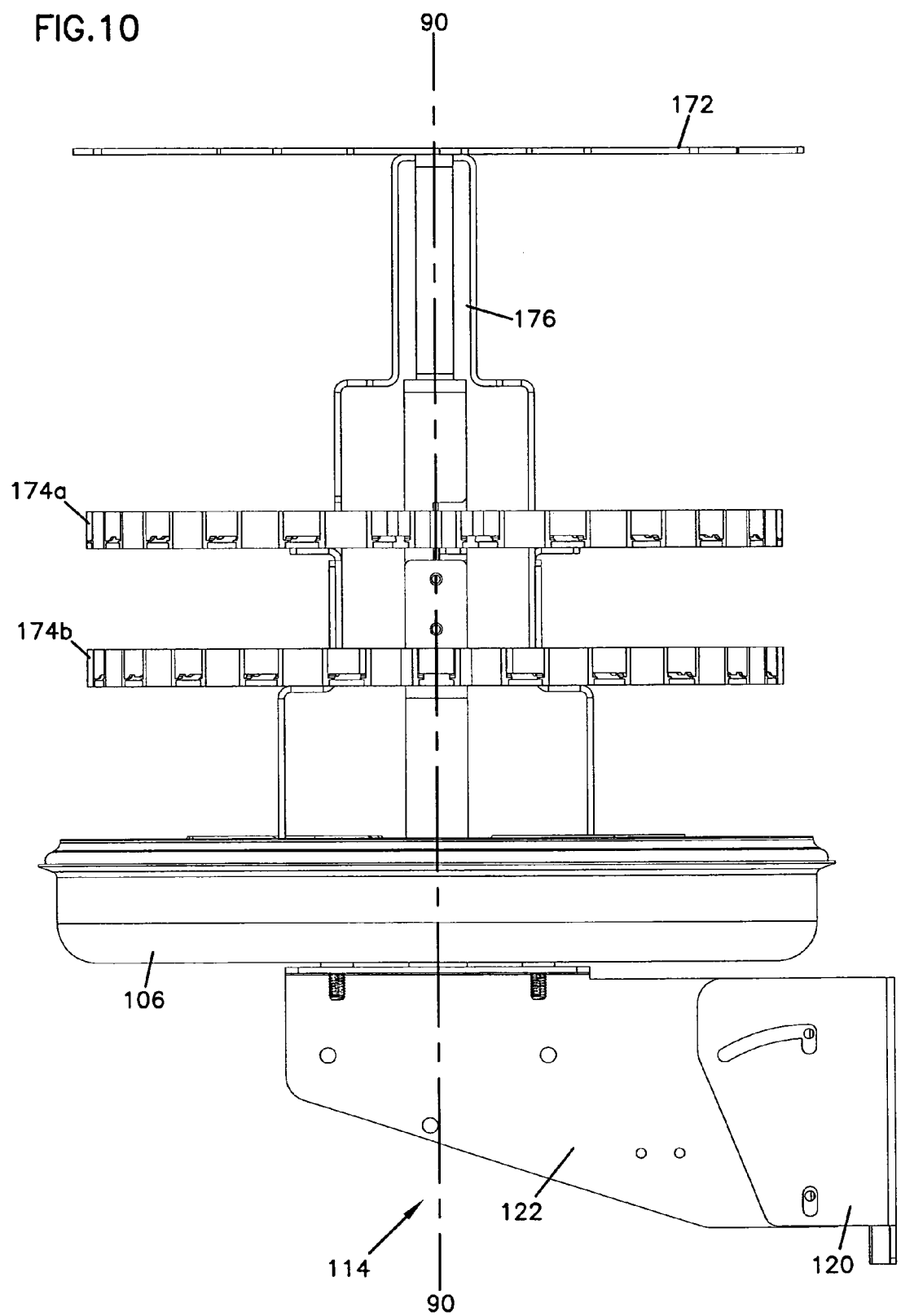
FIG. 10 is a side view of the fiber optic telecommunications distribution system of FIG. 9.

FIGS. 9-10 illustrate the fiber optic telecommunications distribution system 100 with all of the splitter modules 130 and the adapter modules 136 removed. The fiber optic telecommunications distribution system 100 includes a splitter module mount 172 and two adapter module mounts 174a, b (collectively referred to as 174) mounted on a center support structure 176 bolted to the base 106. The details of the splitter module mount 172 and the adapter module mounts 174 will be discussed further below.

Figure 12:
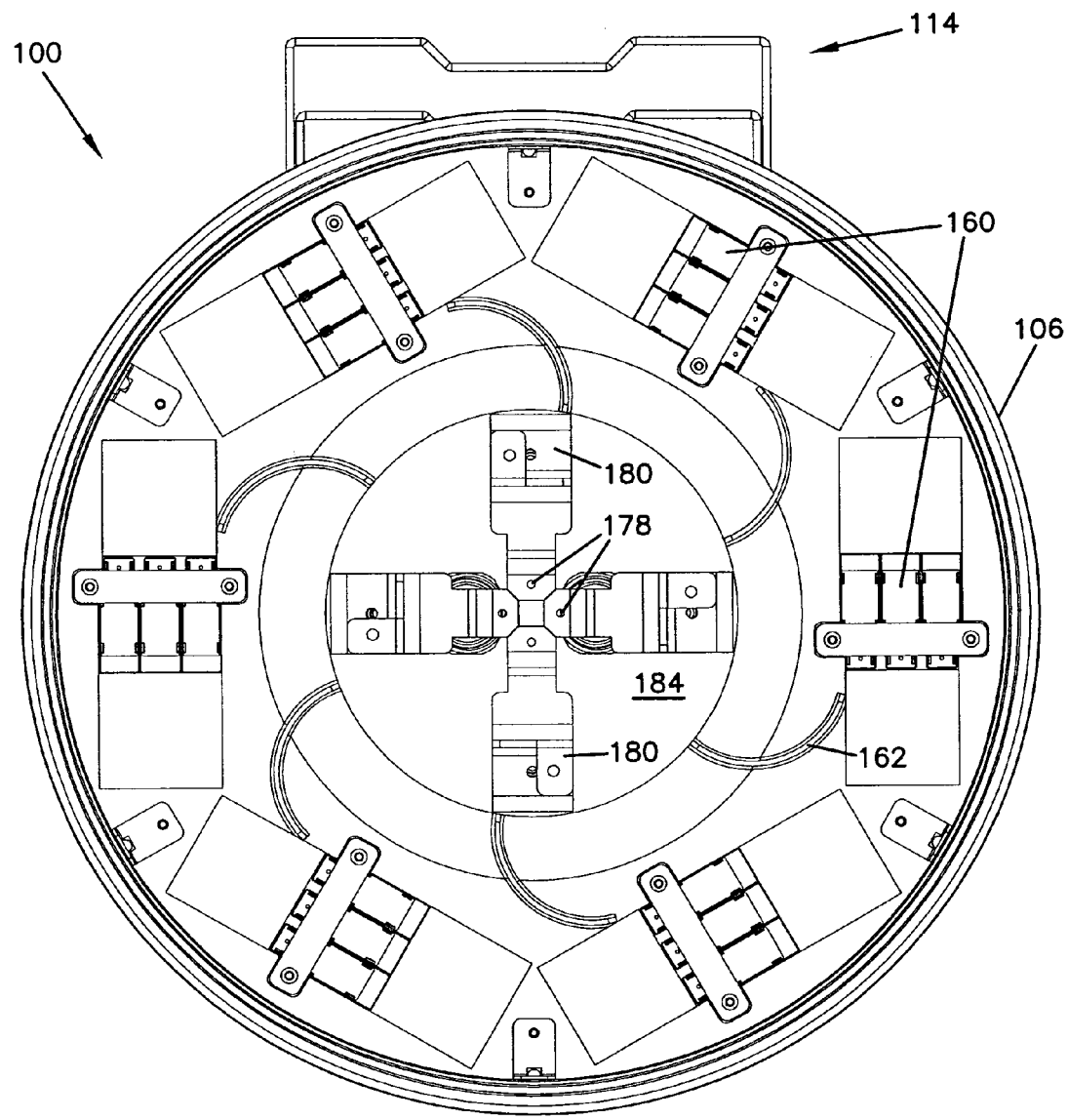
FIG. 12 is a top view of the center support structure and the base of the fiber optic telecommunications distribution system of FIG. 11.

FIG. 11 shows the center support structure 176 of the fiber optic telecommunications distribution system 100. The center support structure 176 is used to mount the radial rows of splitter modules 130 and the adapter modules 136. The center support structure 176 includes fastening holes 178 at the top of the structure 176 for mounting the splitter module mount 172. The center support structure 176 also includes transverse step portions 180 with fastening holes 182 for mounting the two adapter module mounts 174a, b. The center support structure 176 defines a space 184 in the center of the system for accommodating the incoming OSP ribbon cable 132 and the outgoing distribution ribbon cable 164. FIG. 12 shows a top view of the center support structure 176 and the base tray 106 of FIG. 11, illustrating the radially arranged fan-outs 160 and cable management structures 162 located within the base tray 106.

Figure 13:
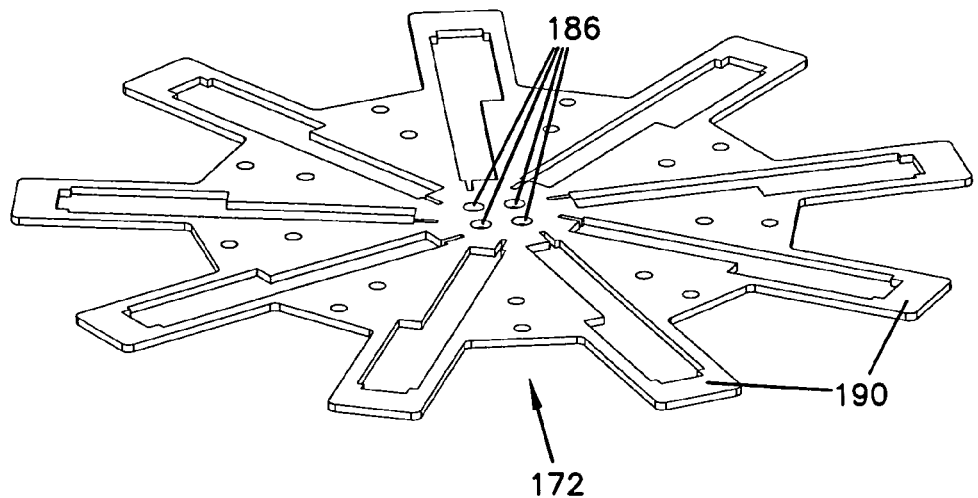
FIG. 13 is a perspective view of a splitter module mount adapted for being mounted to the center support structure of FIGS. 11-12.
Figure 14:
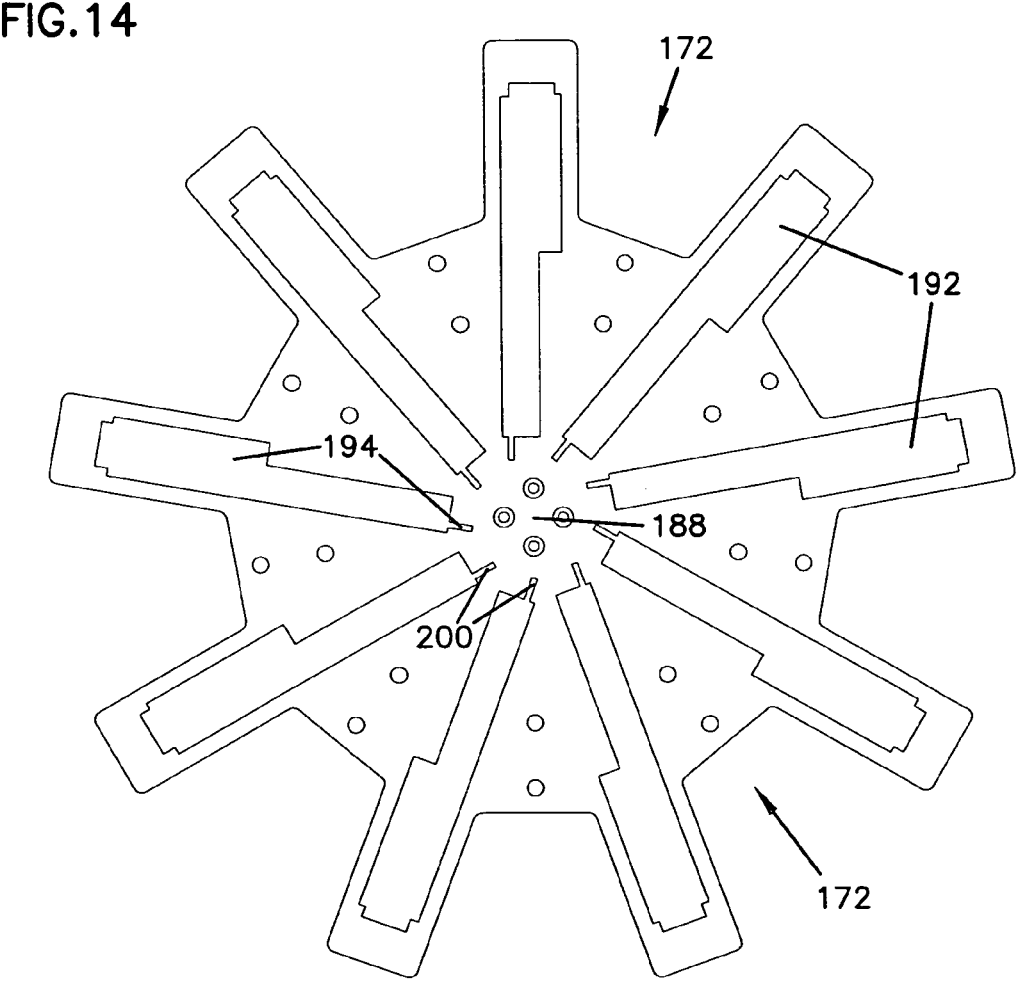
FIG. 14 is a top view of the splitter module mount of FIG. 13.

FIGS. 13-14 show a splitter module mount 172 of the fiber optic telecommunications distribution system 100. The splitter module mount 172 is adapted to be fastened to the top of the center support structure 176 of FIGS. 11-12 and provide structural support for the splitter modules 130, the radius limiters 140, and the adapter assemblies 148 as will be discussed in further detail below.

Figure 15:
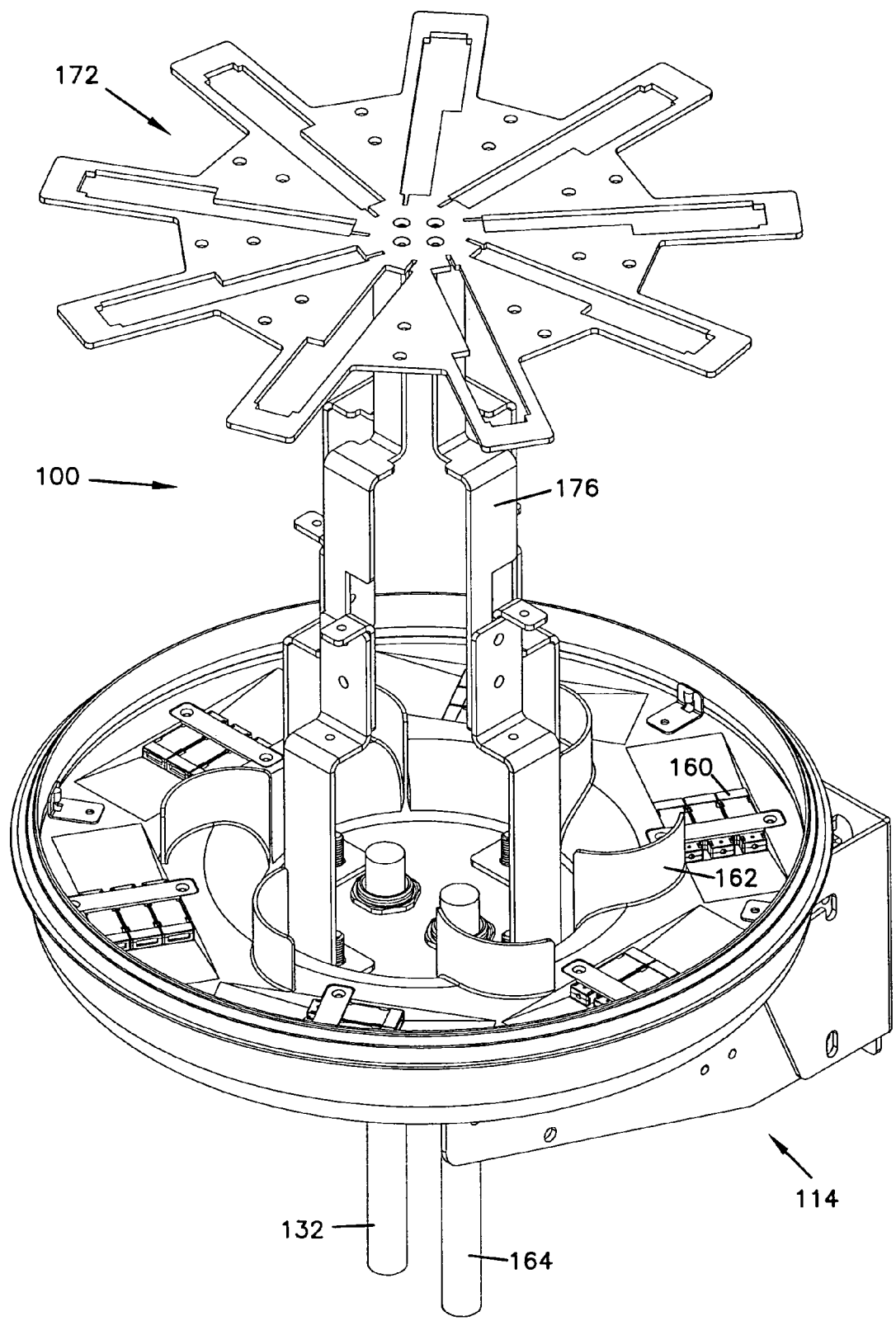
FIG. 15 is a perspective view of the splitter module mount of FIG. 13 mounted on the center support structure of FIGS. 11-12.
Figure 16:
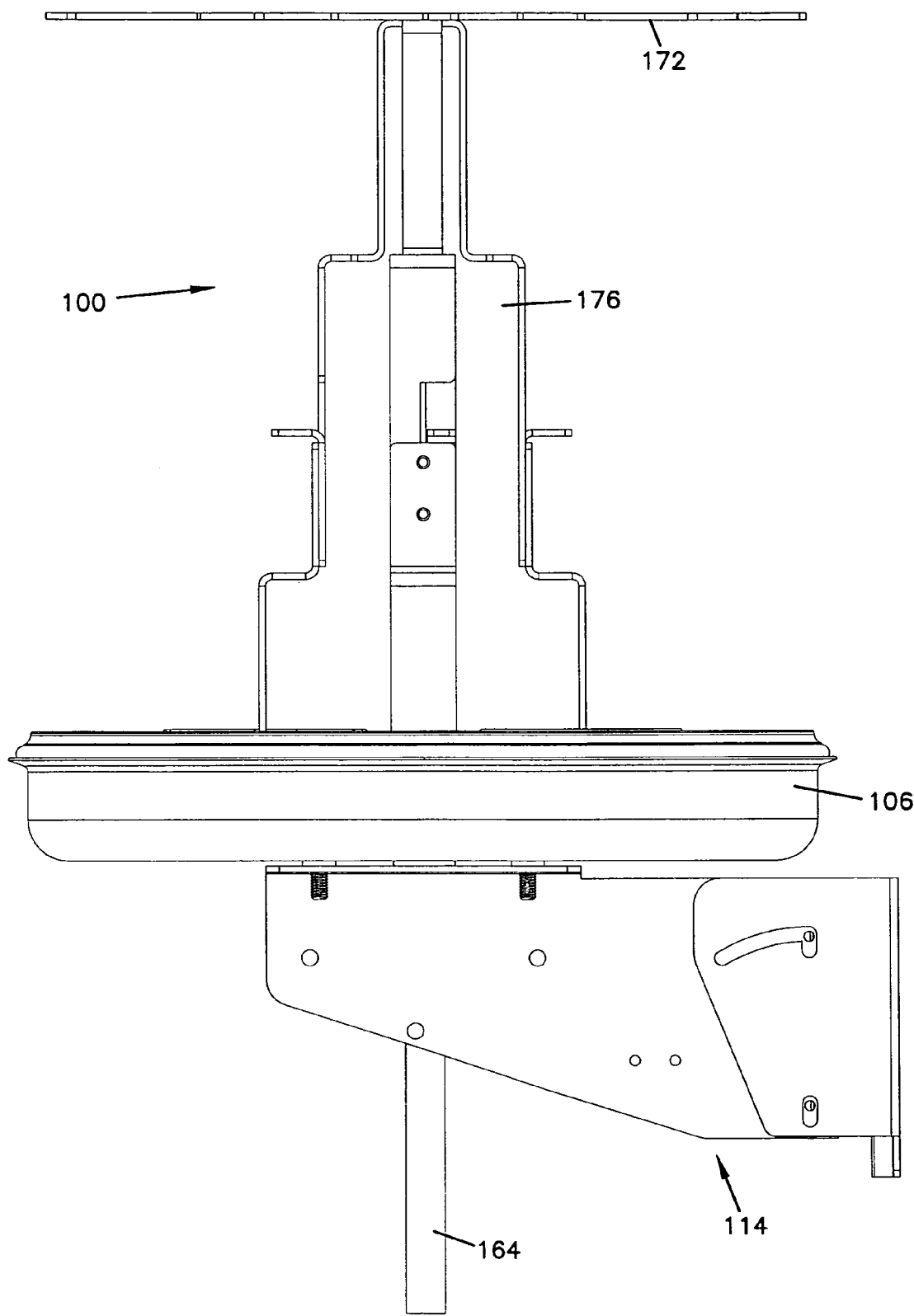
FIG. 16 is a side view of the center support structure, the base, and the splitter module mount of FIG. 13.

In FIGS. 15 and 16, the splitter module mount 172 is shown mounted to the center support structure 176 of the fiber optic telecommunications distribution system 100. The splitter module mount 172 includes four fastening holes 186 located at the center 188 of the mount 172 for mounting to the top of the center support structure 176.

Figure 17:
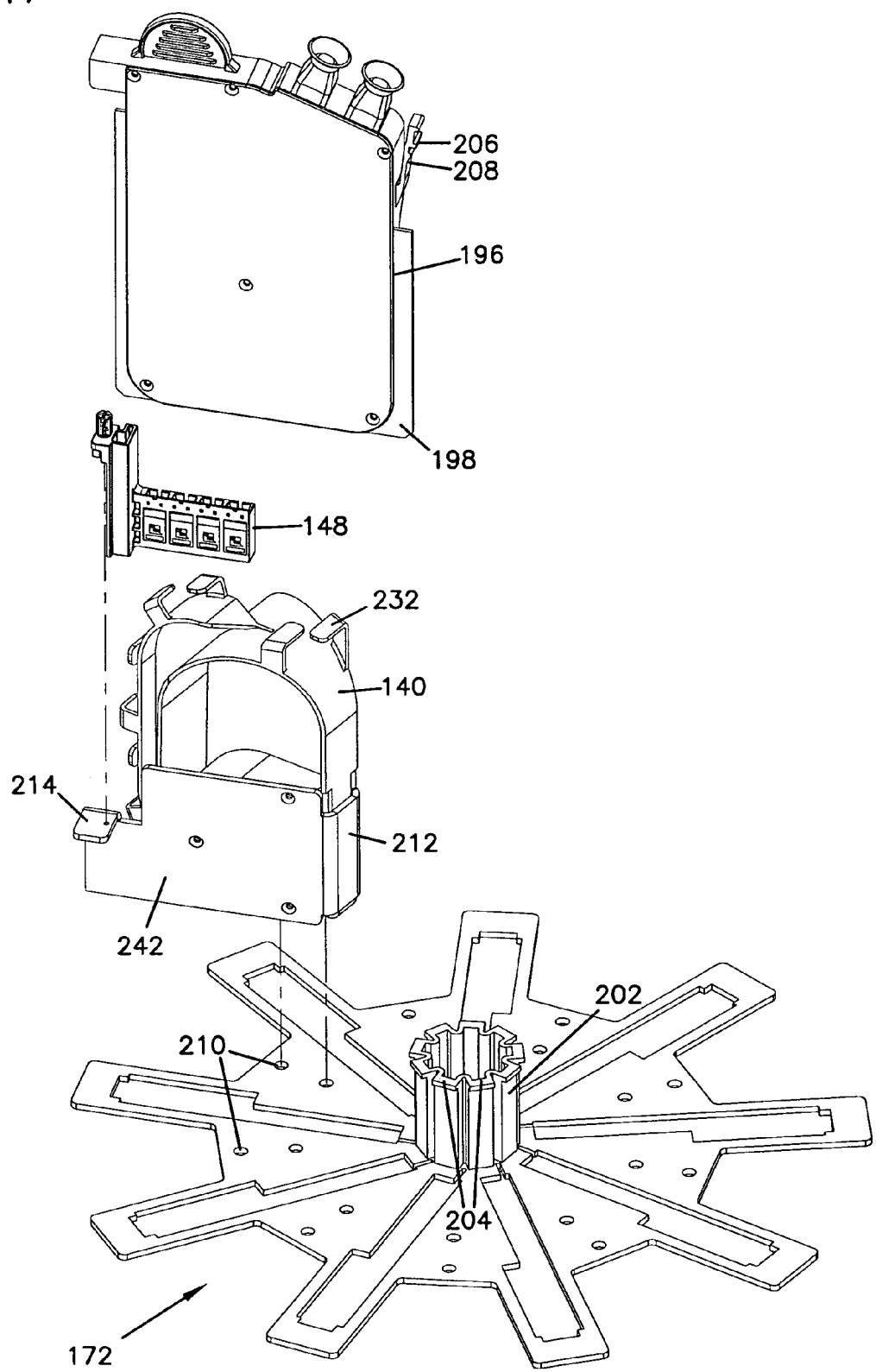
FIG. 17 shows an exploded view of one splitter module, the mating adapter assembly, and one radius limiter exploded from the splitter module mount of FIG. 13.

FIG. 17 shows an exploded view of the splitter module 130, the adapter assembly 148, and the radius limiter structure 140 exploded from the splitter module mount 172. The splitter module mount 172 includes radially extending arms 190 and slots 192 defined in the arms 190 for receiving the splitter modules 130. The slots 192 for receiving the splitter modules 130 are configured to form keying structures 194 for receiving the splitter modules 130 in the proper orientation. Referring to FIG. 17, the splitter module edges 196 include flanges 198 that mate with slits 200 defined by the slots 192 of the splitter module mount 172. The splitter module mount 172 includes a longitudinal center extension 202 that provides a snap fit structure for locking the splitter modules. The longitudinal extension 202 includes a peripheral lip portion 204 for mating with tabs 206 of cantilever arms 208 of each of the splitter modules 130 as the splitter modules 130 are slid into the slots 192 of the mount 172.

Figure 4:
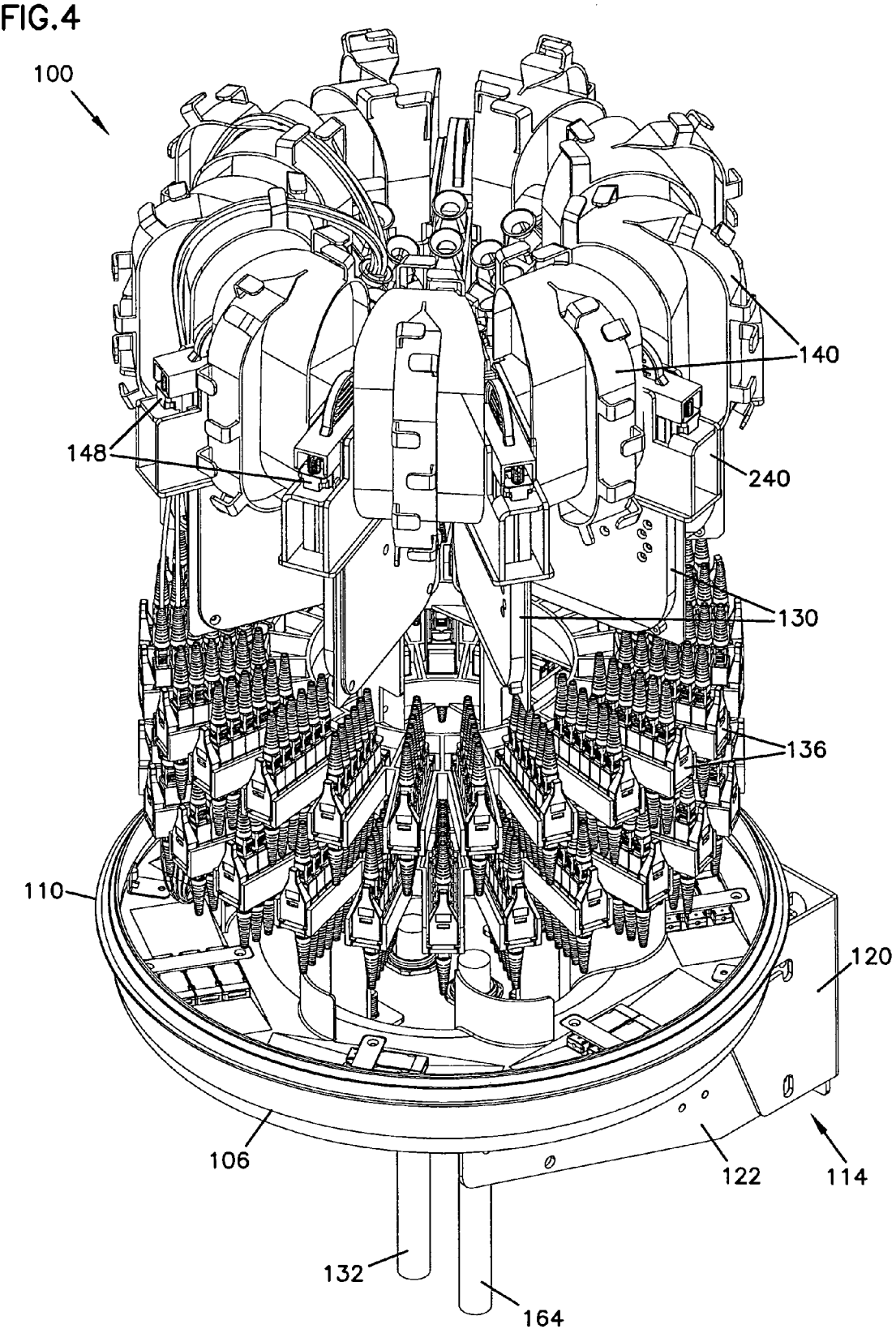
FIG. 4 is a perspective view of the fiber optic telecommunications distribution system of FIG. 1, the distribution system shown with the cover of the enclosure removed to provide access to inner components of the system.
Figure 5:
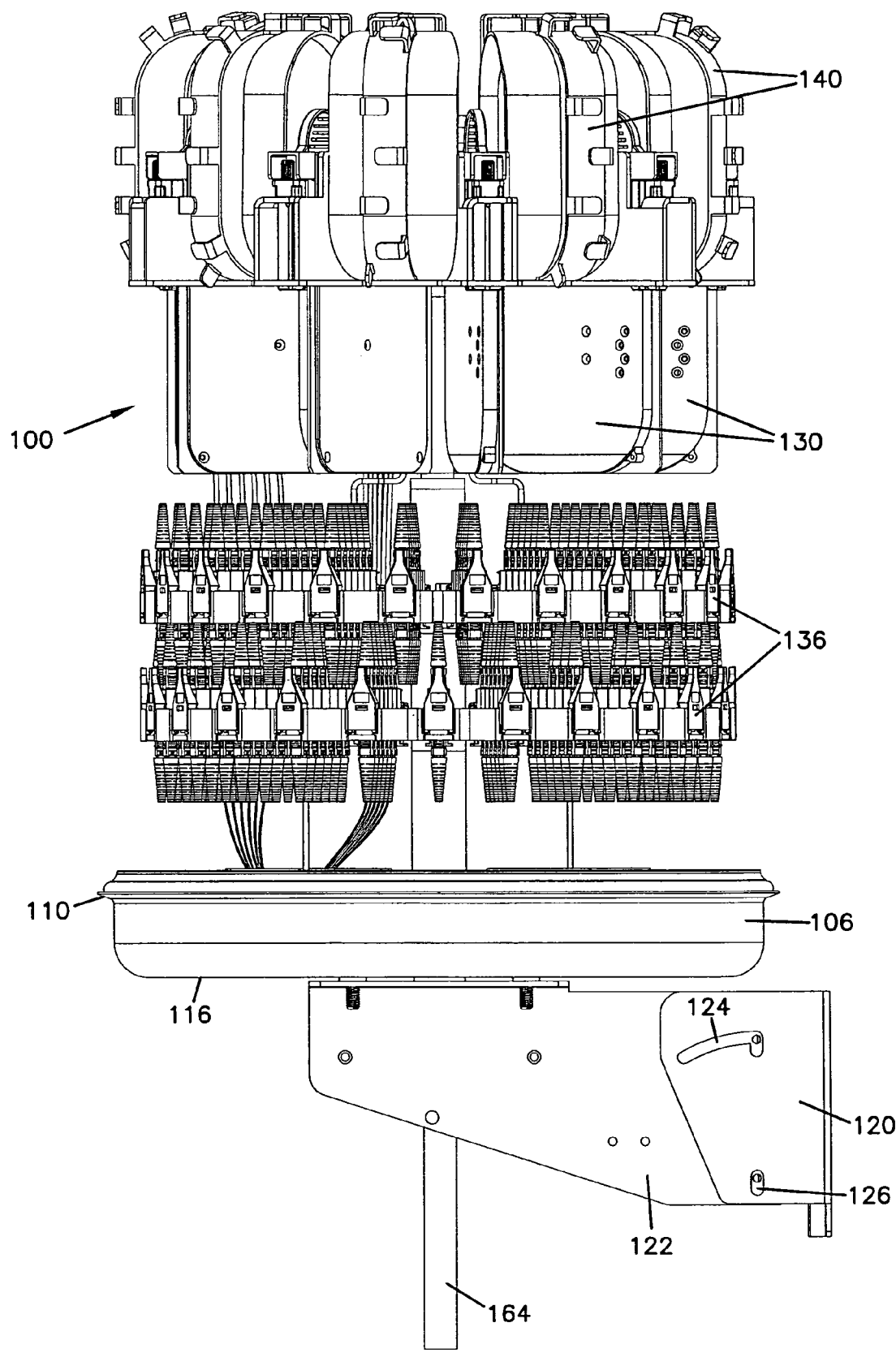
FIG. 5 is a side view of the fiber optic telecommunications distribution system of FIG. 4.
Figure 6:
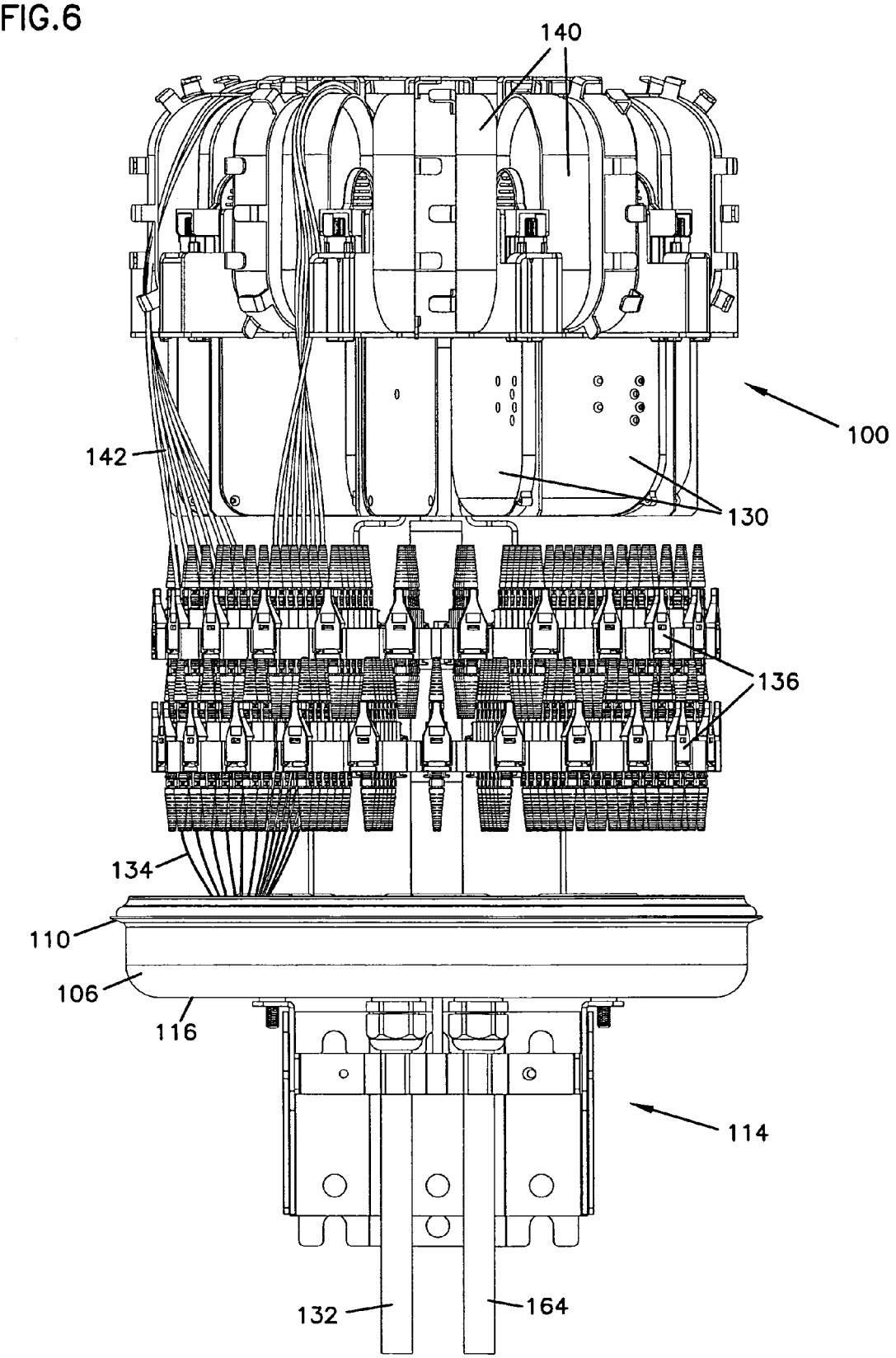
FIG. 6 is a front view of the fiber optic telecommunications distribution system of FIG. 4.
Figure 7:
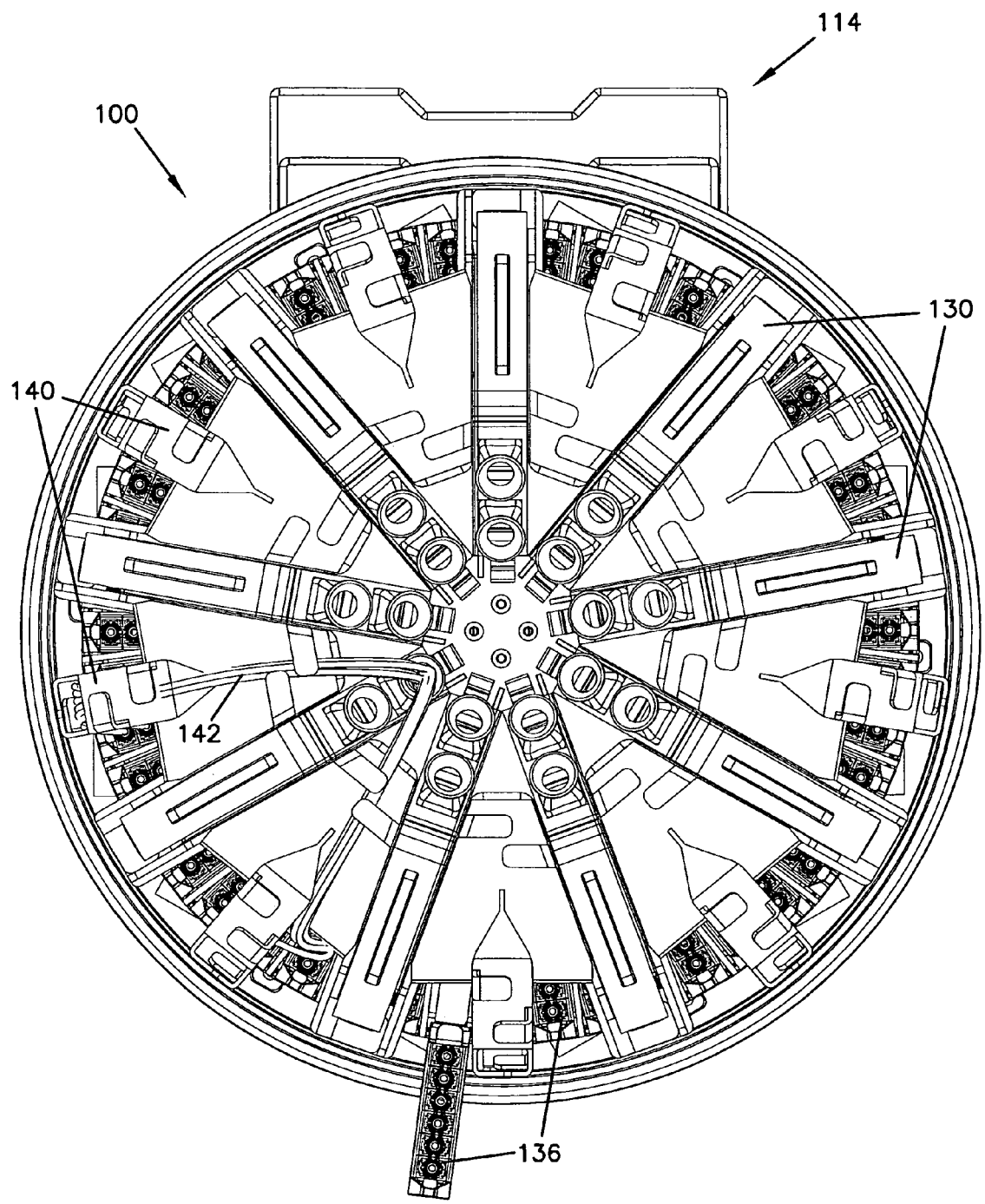
FIG. 7 is a top view of the fiber optic telecommunications distribution system of FIG. 4.
Figure 18:
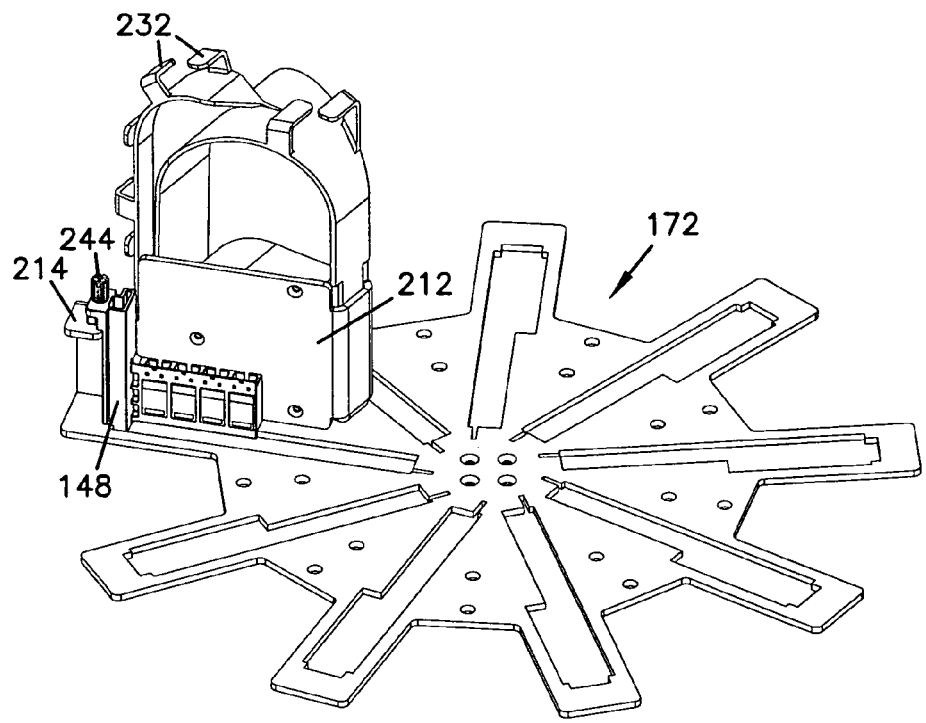
FIG. 18 shows the radius limiter and the adapter assembly mounted to the splitter module mount of FIG. 17.
Figure 19:
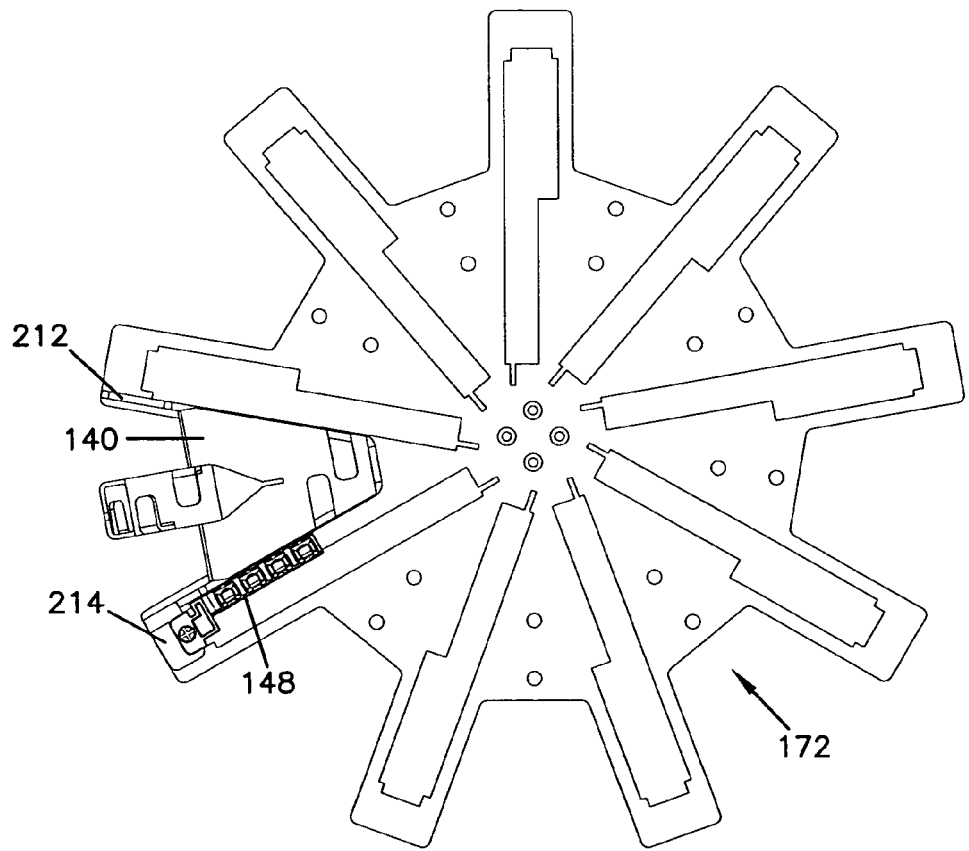
FIG. 19 is a top view of the splitter module mount of FIG. 18.

The splitter module mount 172 also includes fastening holes 210 for mounting the radius limiters 140. The radius limiters 140 are mounted in between the splitter modules 130. As will be discussed further below, the radius limiters 140 provide for cable management of the output cables 142 coming out of the splitter modules 130 and also provide a mounting location for the adapter assemblies 148 that mate with the splitter modules 130. As shown in FIGS. 17 and 18, the radius limiter structures 140 include a V-shaped sideplate 212 that has a transversely extending tab 214 with a fastening hole 216 for mounting an adapter assembly 148. The radius limiter 140 and the adapter assembly 148 are shown in a mounted configuration in FIG. 18. Once mounted, the adapter assemblies 148 are aligned with the splitter modules 130 as illustrated in FIGS. 4-6. In the depicted embodiment of the fiber optic telecommunications distribution system 100, the splitter module mount 172 is configured for mounting nine splitter modules 130 and nine radius limiters 140. Other numbers are also contemplated.

Figure 22:
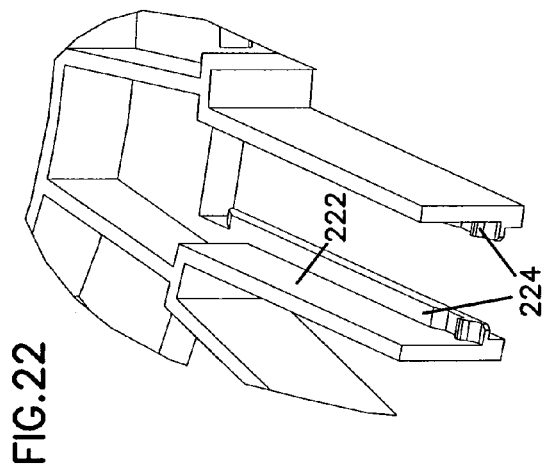
FIG. 22 is a close-up of a portion of the adapter module mount of FIG. 20 showing the guide rails of the adapter module mount.
Figure 20:
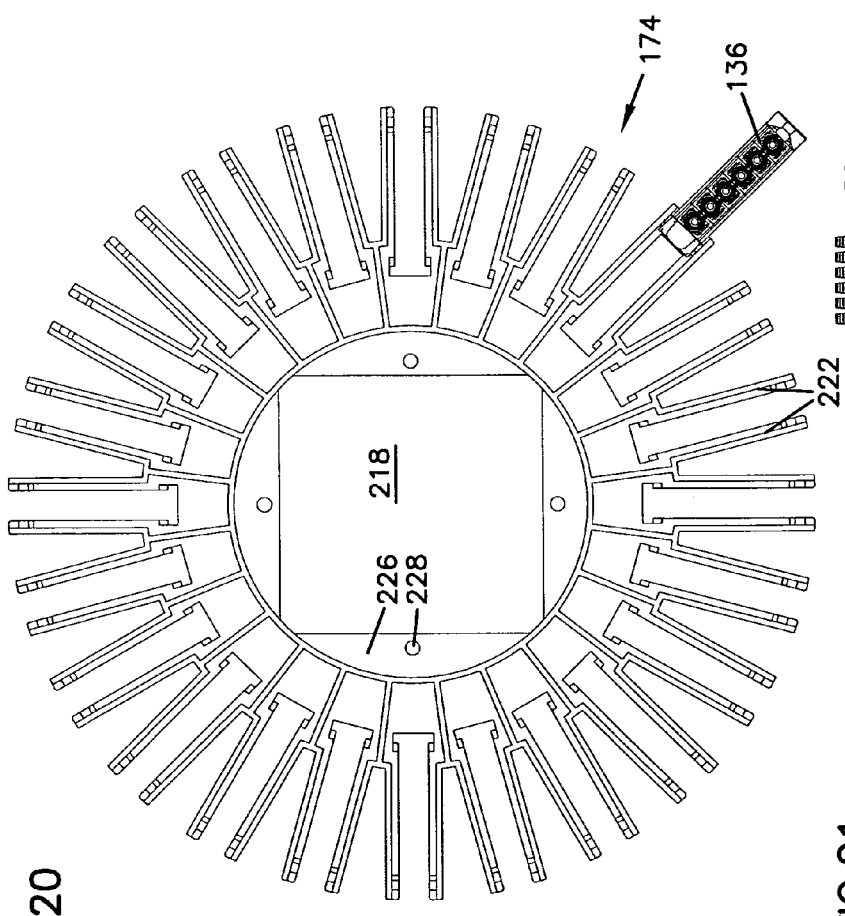
FIG. 20 is a top view of an adapter module mount adapted for being mounted to the center support structure of FIGS. 11-12, the adapter module mount is shown with all of the adapter modules removed except for one adapter module and corresponding connectors, with the adapter module extended.
Figure 21:
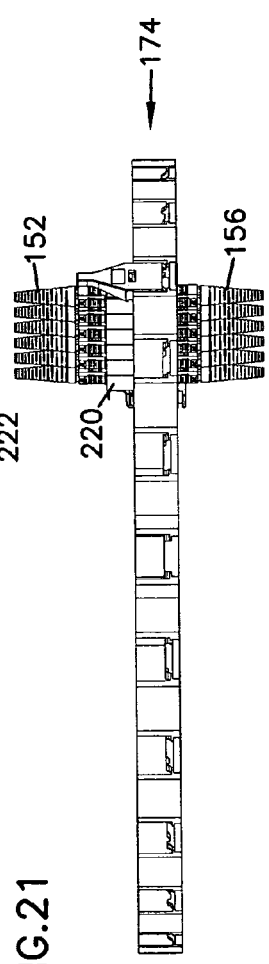
FIG. 21 is a side view of the adapter module mount of FIG. 20, with the adapter module retracted.

FIG. 20-22 illustrate the adapter module mount 174 of the fiber optic telecommunications distribution system 100. The adapter module mount 174 is adapted for providing structural support for and radially mounting the adapter modules 136 to the fiber optic telecommunications distribution system 100. The adapter module mount 174 includes a center opening 218 for accommodating feeder cables 132. The adapters 220 are mounted on movable adapter modules 136, which are slidable between a retracted position to an extended position as shown in the FIG. 20. The adapter module mount 174 includes radially positioned guides or walls 222 for slidably receiving the adapter modules 136. The walls 222 define guide rails 224 for allowing slidable movement of each adapter module 136 (see FIG. 22). The slidability of the adapter modules 136 facilitate access to the adapters 220 therein and the corresponding cable connectors 152/156. Sliding adapter modules are described in greater detail in commonly owned U.S. Pat. Nos. 5,497,444; 5,717,810; and 6,591,051, the disclosures of which are hereby incorporated by reference. The slidability feature of the adapter modules 136 enables easier access to the adapter modules 136 mounted on the center support structure 176 of the fiber optic telecommunications distribution system 100.

Figure 23:
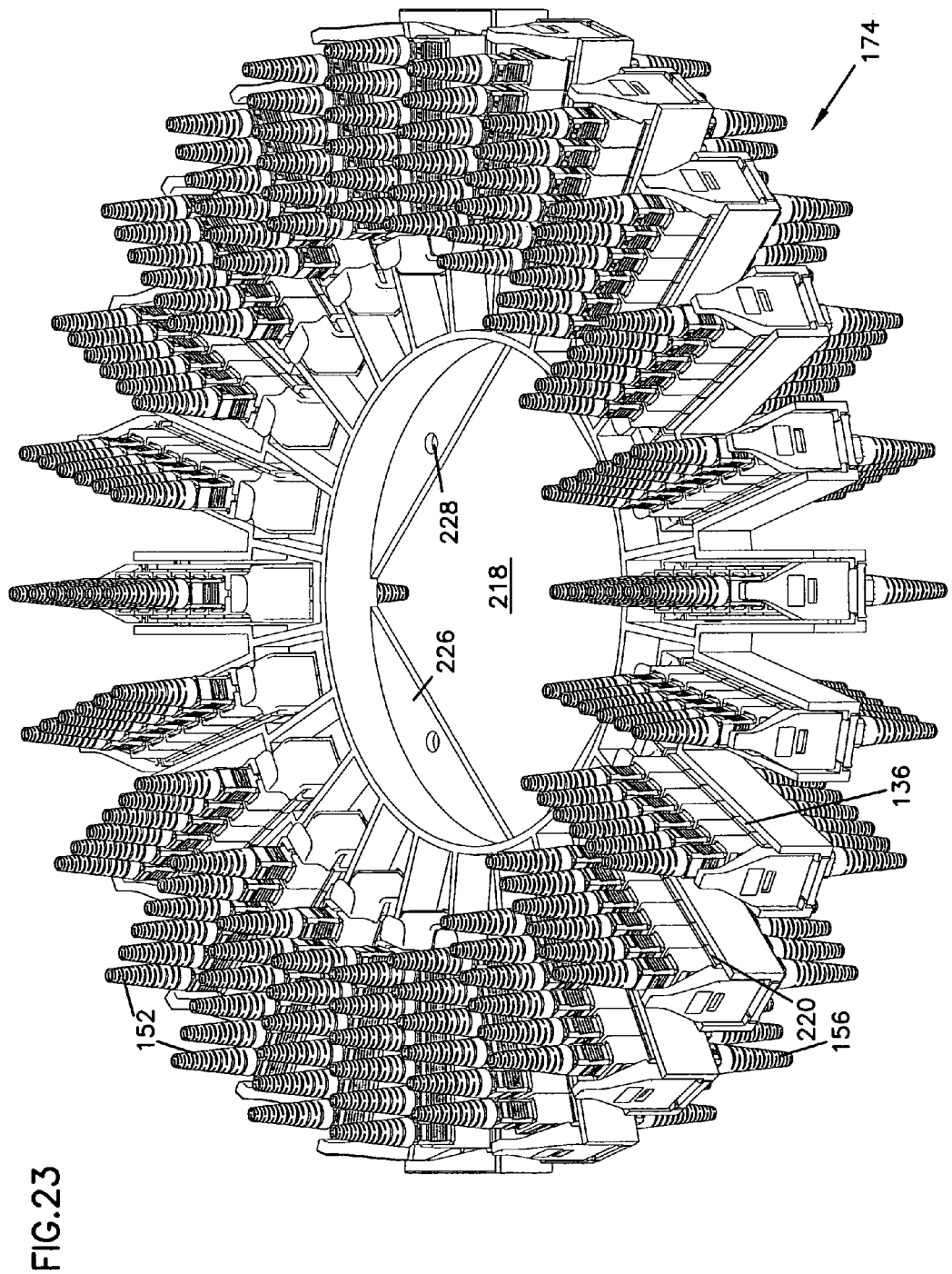
FIG. 23 shows the adapter module mount with all of the adapter modules and corresponding connectors mounted thereon.
Figure 24:
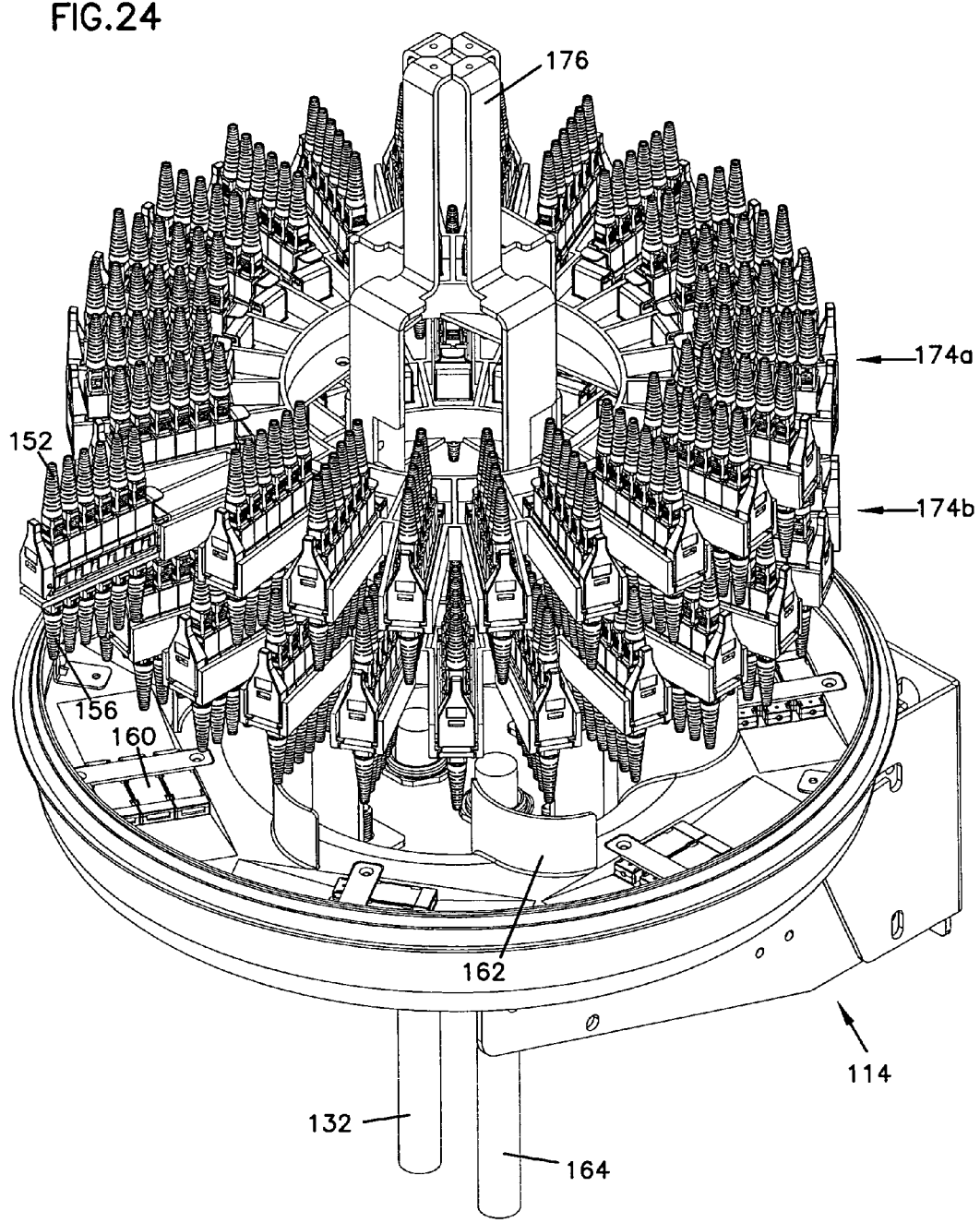
FIG. 24 shows two fully-loaded adapter module mounts mounted on the center support structure of the fiber optic distribution system of FIG. 9, the adapter module mounts being positioned in an offset orientation with respect to each other.
Figure 25:
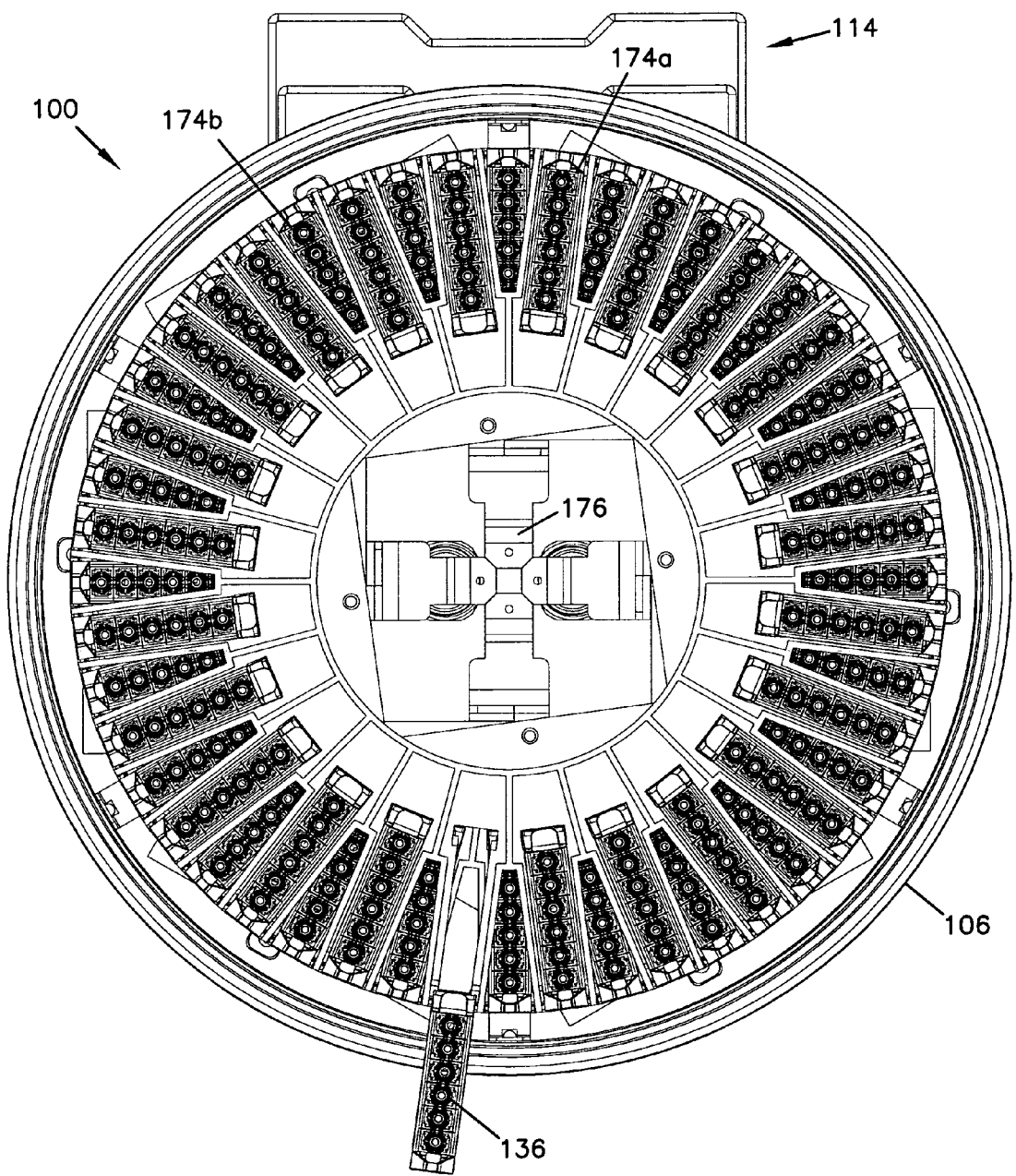
FIG. 25 shows a top view of the fiber optic distribution system of FIG. 24.
Figure 26:
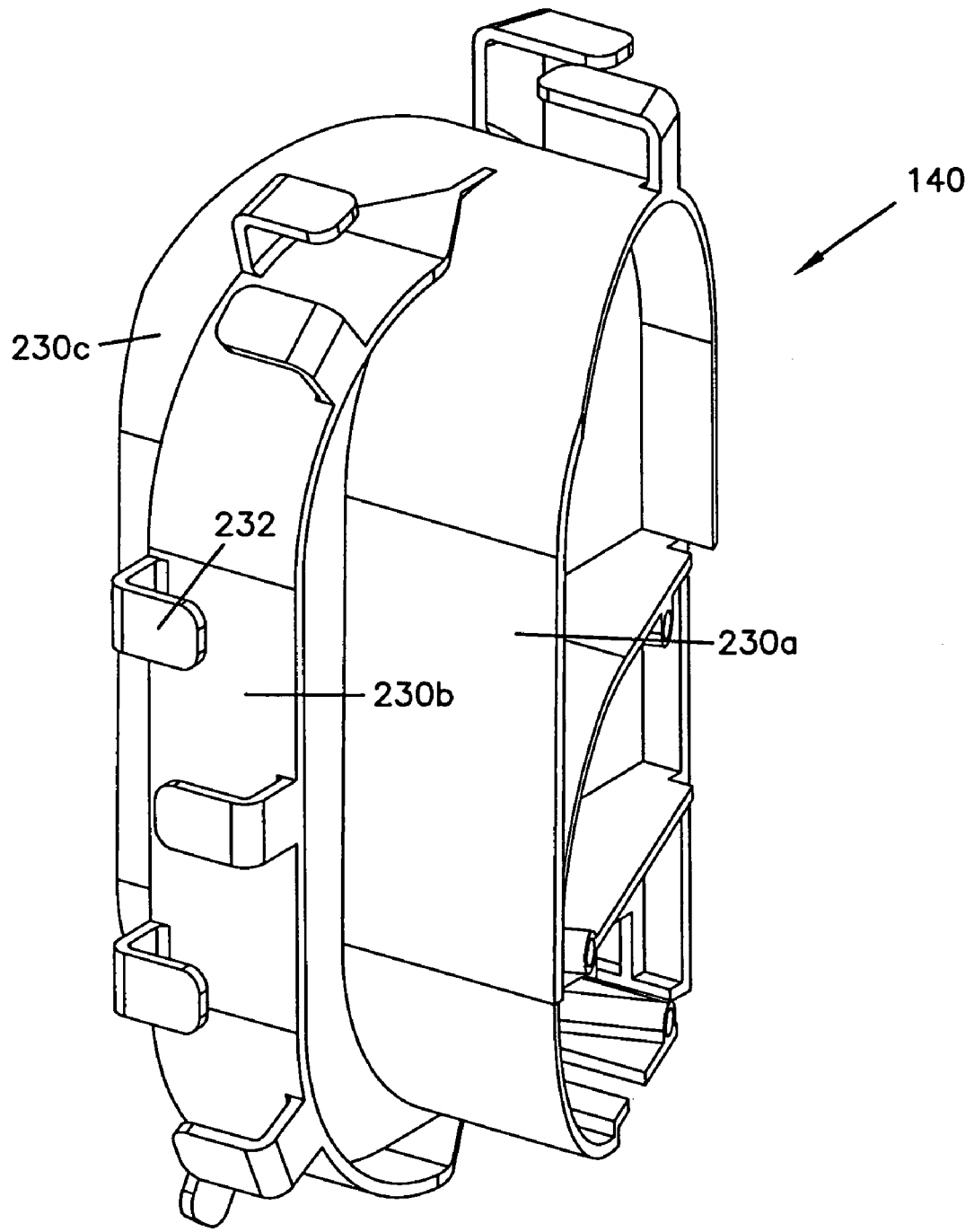
FIG. 26 is a back, top perspective view of the radius limiter structure of FIGS. 17-19.
Figure 27:
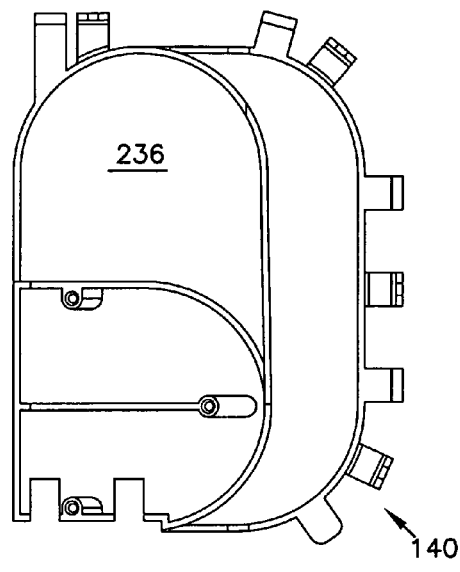
FIG. 27 is right side view of the radius limiter structure of FIG. 26.
Figure 28:
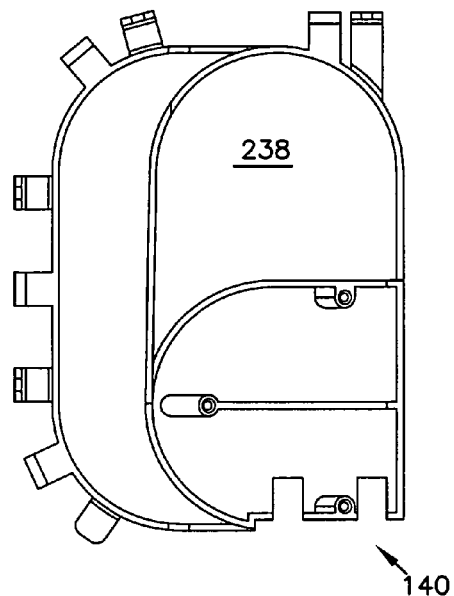
FIG. 28 is a left side view of the radius limiter structure of FIG. 26.
Figure 29:
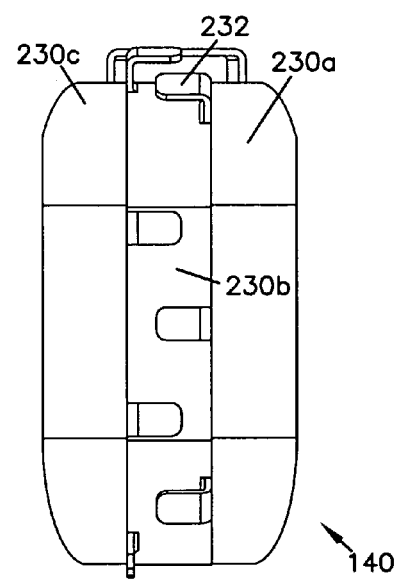
FIG. 29 is a back view of the radius limiter structure of FIG. 26.
Figure 30:
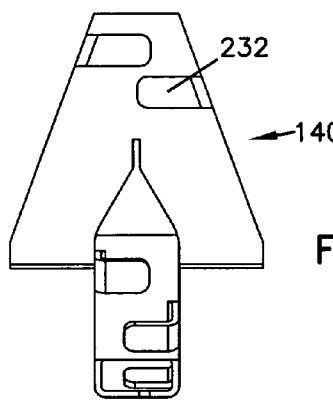
FIG. 30 is a top view of the radius limiter structure of FIG. 26.
Figure 31:
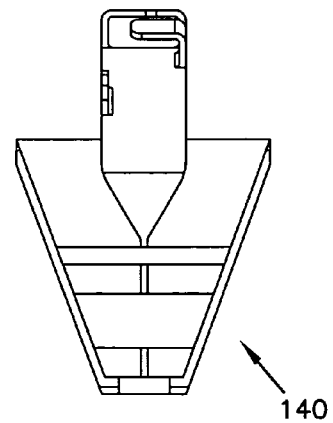
FIG. 31 is a bottom view of the radius limiter structure of FIG. 26.

FIG. 23 shows the adapter module mount 174 with all of the adapter modules 136 and corresponding connectors 152/156 mounted thereon. The adapter module mount 174 includes four inner flanges 226 located around the center opening 218 of the mount 174, the flanges 226 including fastening holes 228 for fastening the mount 174 to the center support structure 176. In FIG. 24, the center support structure 176 is shown with two fully-loaded adapter module mounts 174a, b mounted thereon. Preferably, the two adapter module mounts 174a, b are identical to each other. The two mounts 174a, b are mounted to the transverse step portions 180 of the center support structure 176. The transverse step portions 180 of the center support structure 176 are configured such that the two layers of adapter modules 136 are positioned in an offset orientation with respect to each other when mounted on (see FIG. 25). In one embodiment of FIGS. 20-25, each mount 174a, b is configured to support 24 adapter modules 136, with the two layers totaling 48 adapter modules 136. And each adapter module 136 is configured to hold 6 adapters 220, the fiber optic telecommunications distribution system 100 being able to accommodate a total of 288 resident distribution fibers.

FIGS. 26-31 illustrate the radius limiter structure 140 of the fiber optic telecommunications distribution system 100. As mentioned before, the radius limiter structure 140 is mounted between two adjacent splitter modules 130. The radius limiter 140 is configured to provide cable management for directing the output cables 142 to the adapter modules 136 and also serve as a mounting location for the input adapter assembly 148 that mates with each splitter module 130. As shown in FIGS. 26-31, each radius limiter 140 includes three cable management lanes 230a, b, c for cable routing. The center lane 230b is raised with respect to the two side lanes 230a and 230c. The radius limiter structure 140 includes bent fingers 232 for managing the cables 142 from the splitter module outputs 138 to the adapter modules 136. As mentioned before, since the fiber optic telecommunications distribution system 100 provides for a radial arrangement of the splitter modules 130 and the adapter modules 136, output cables 142 of the splitter modules 130 can be routed to the adapter modules 136 without requiring any slack in the cable 142. The radius limiter structure 140 includes three fastening holes 234 on each of the right 236 and left sides 238 thereof for mounting a V-shaped plate 212. The V-shaped plate 212 (shown in FIGS. 4-7 and 17-19) defines a flat sidewall 240 on the right side 236 of the radius limiter 140 and a sidewall 242 with a bent tab 214 on the left side 238 of the radius limiter 140. The transverse extending bent tab 214 provides structural support for mounting an adapter assembly 148. The bent tab 214 includes a fastening hole 216 that receives a mounting screw 244 of the adapter assembly. The adapter assembly 148 will be described in further detail below.

Figure 32:
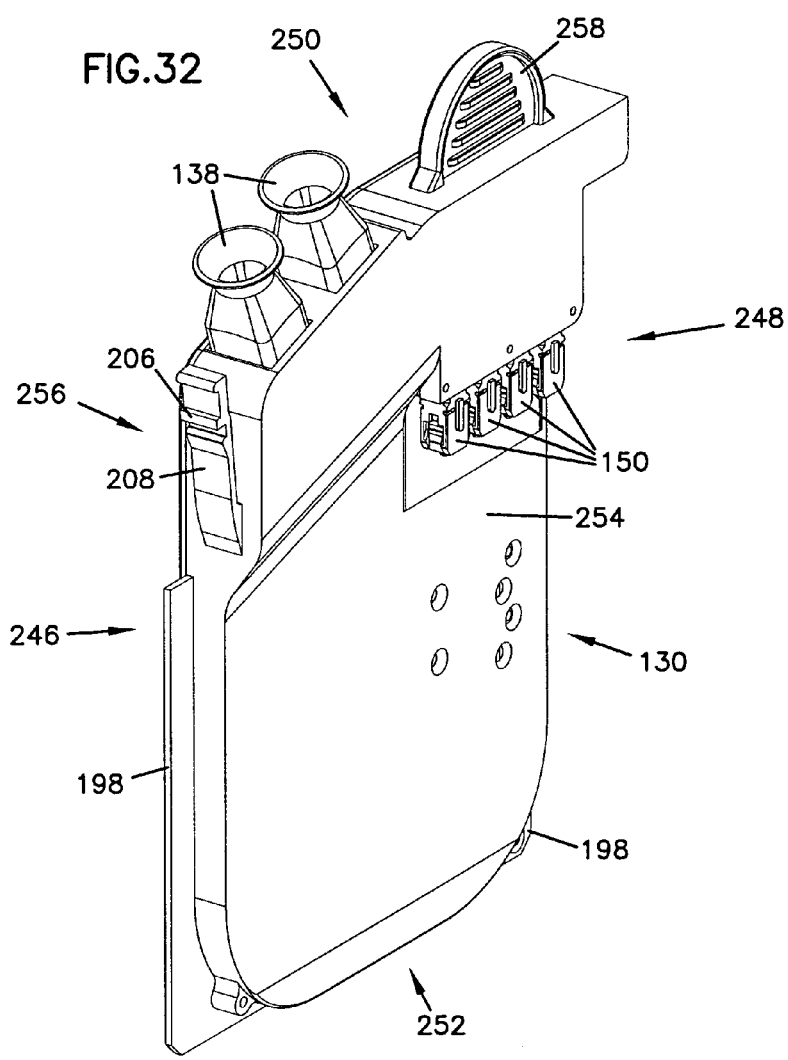
FIG. 32 is a perspective view of the splitter module of the fiber optic telecommunications distribution system of FIG. 1.

FIG. 32 illustrates a perspective view of the splitter module 130 of the fiber optic telecommunications distribution system 100. The splitter module 130 includes a generally rectangular shape with a front end 246, a back end 248, a top end 250, a bottom end 252, a left side 254, and a right side 256. The top end 250 includes cable outputs 138. Located adjacent the left side 254 are four input connectors 150 that extend vertically to minimize the thickness of the splitter module 130. The four input connectors 150 are adapted to mate with the adapter assembly 148 mounted on the radius limiters 140. Once the signal is input into the splitter module 130 through the four connectors 150, the signal is split into thirty-two signals by internal splitter circuitry within the splitter module 130. Each output 138 is constructed to accommodate 16 output cables 142. In the depicted embodiment of the fiber optic telecommunications distribution system 100, since nine splitter modules 130 are used, a total of two hundred eighty-eight distribution signals can be provided.

The front 246 and the back ends 248 of the splitter module 130 include guide flanges 198 for guiding the splitter modules 130 into the slots 192 of the splitter module mount 172. A handle 258 is provided adjacent the top end 250 of the splitter module 130 for facilitating insertion and removal of the splitter modules 130 from the fiber optic telecommunications distribution system 100. A cantilever arm 208 with tabs 206 is provided adjacent the front, top end of the splitter module 130. This cantilever arm 208 provides a snap-fit with the longitudinal extension 202 defined on the splitter module mount 172.

The splitter modules 130 and the adapter assemblies 148 are described in greater detail in commonly owned patent applications entitled FIBER OPTIC SPLITTER MODULE and FIBER OPTIC ADAPTER MODULE, being filed on the same date as the present application, the entire disclosures of which are hereby incorporated by reference and also U.S. application Ser. No. 10/980,978, filed Nov. 3, 2004, the entire disclosure of which is hereby incorporated by reference.

Figure 33:
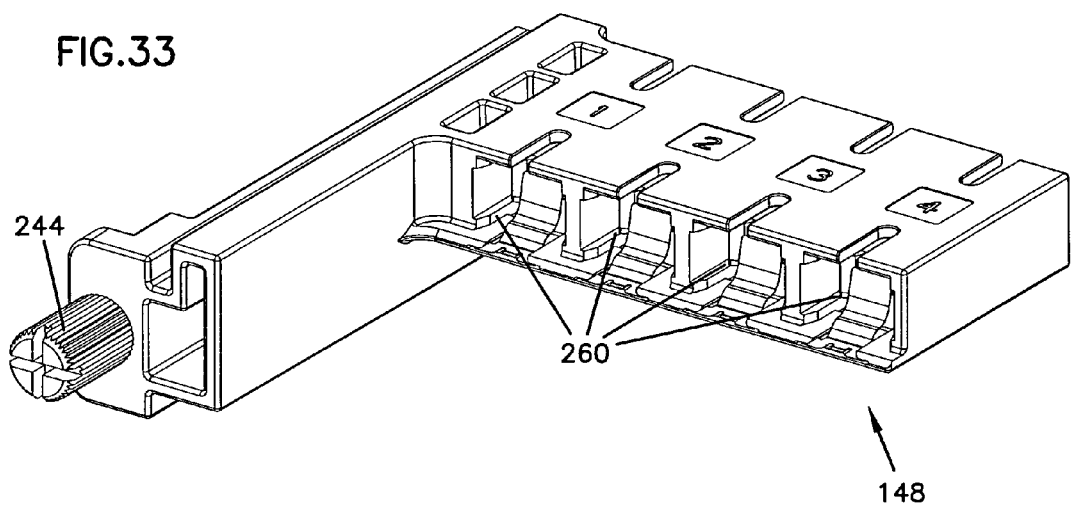
FIG. 33 is a perspective view of the adapter assembly of FIGS. 17-19, the adapter assembly being adapted to be mounted to the radius limiter structure of FIG. 26 and mate with connectors of the splitter module of FIG. 32.

FIG. 33 illustrates an adapter assembly 148 of the fiber optic telecommunications distribution system. The adapter assembly 148 defines four integrally mounted adapters 260 for connecting the fanned-out outside plant cables 132 to the input connectors 150 of the splitter module 130. The adapter assemblies 148 are coupled to the fiber optic telecommunications distribution system 100 via the radius limiters 140. As discussed previously, the mounting screw 244 is used to couple the adapter assembly 148 to the transverse tabs 214 defined on sides 238 of the radius limiters 140 and can be removed for cleaning of bottom connectors.

FIG. 34 shows a perspective view of a service blocker 158 adapted for use with the fiber optic telecommunications distribution system 100 of FIGS. 1-33. For those customers who are currently not ready to accept and utilize fiber optic connectivity service, the service blocker 158 is used to block the fiber optic signal between the output cables 142 coming out of the splitter module outputs 138 and the customer equipment cables 134. As depicted, a first end 262 of the service blocker is configured to mate with a connector and a second end 264 is configured to mate with an adapter. FIG. 35 shows an exploded view showing the placement position of the service blocker 158 within the signal chain. FIG. 36 shows the adapter, the two fiber optic connectors, and the service blocker 158 in an assembled configuration.

Once a customer desires fiber optic connectivity, the service blocker 158 is simply removed between the output cable 142 and the distribution cable 134 that is connected to a customer equipment. The service blocker 158 is described in greater detail in a commonly owned patent application entitled FIBER OPTIC SERVICE BLOCKER, being filed on the same date as the present application, the entire disclosure of which is hereby incorporated by reference and also U.S. application Ser. No. 11/010,460, filed Dec. 13, 2004, the entire disclosure of which is hereby incorporated by reference.

Figure 37:
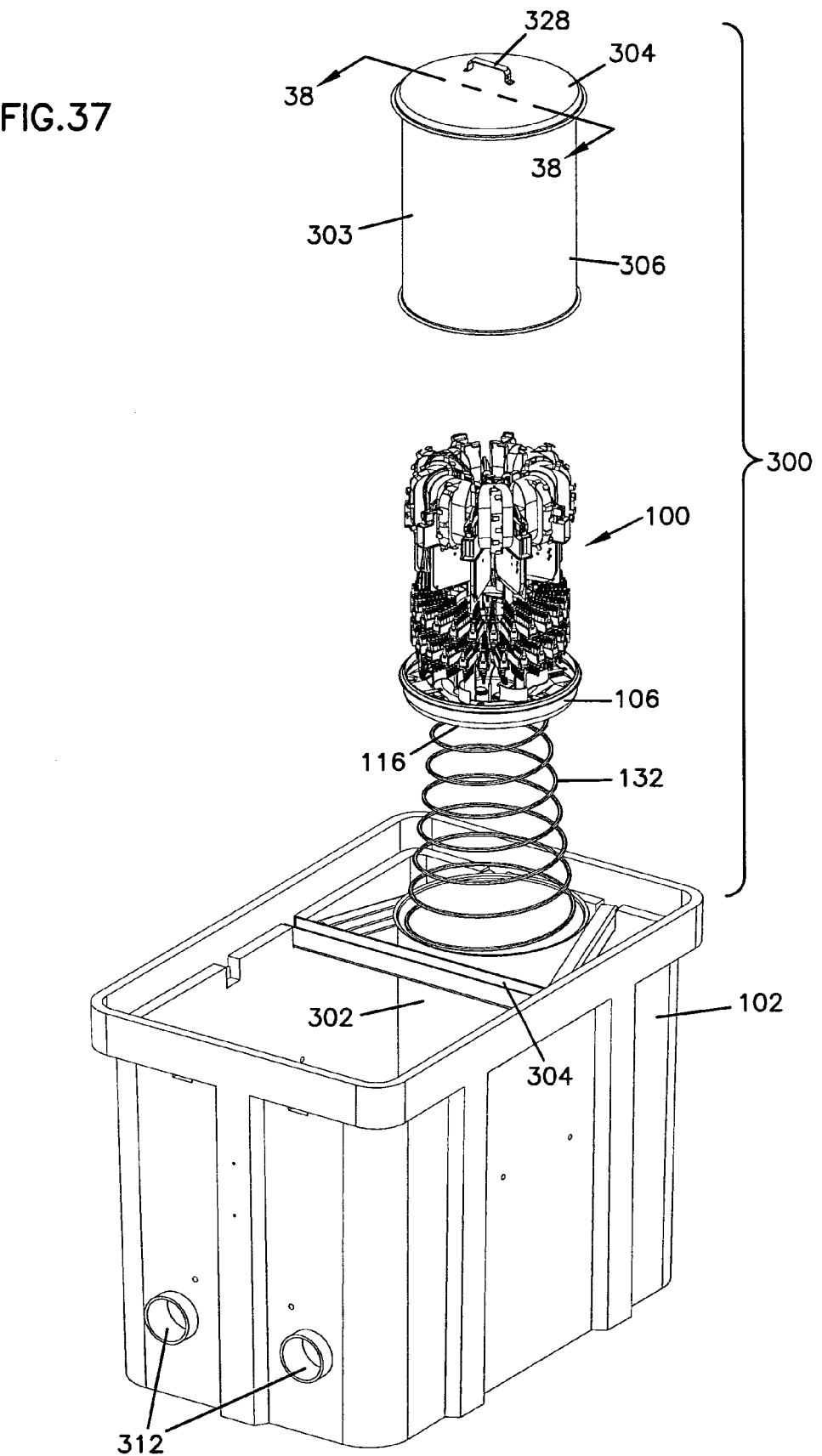
FIG. 37 illustrates an exploded view of an underground vault mounting fixture adapted for use with the fiber optic telecommunications distribution system of FIGS. 1-33.
Figure 38:
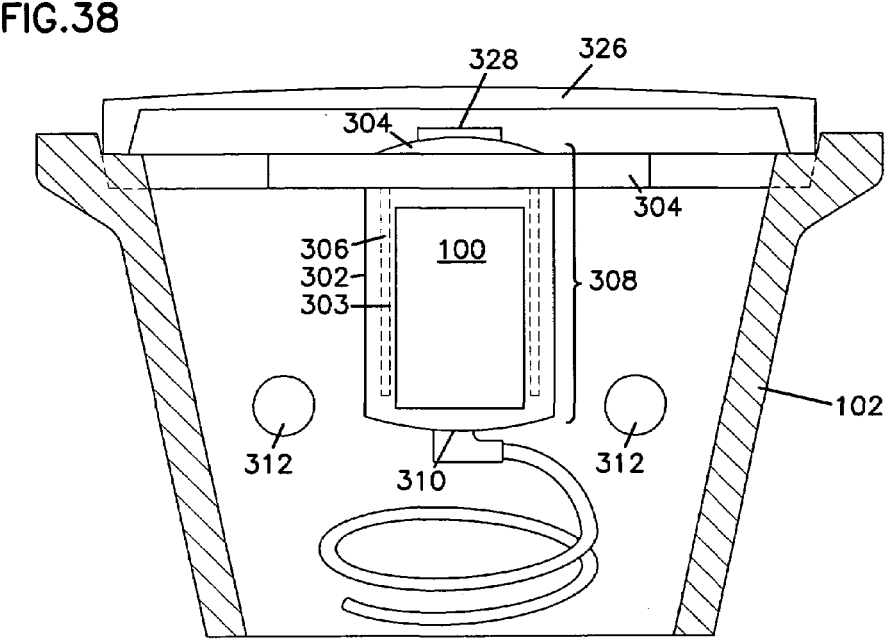
FIG. 38 is a cross-sectional view taken along line 38-38 of FIG. 37, the fiber optic telecommunications distribution system is shown mounted in the vault utilizing the underground vault mounting fixture of FIG. 37, with a lid of the vault closing the vault.

In FIG. 37, there is illustrated an exploded view of an underground vault mounting fixture 300 adapted for use with the fiber optic telecommunications distribution system 100 of FIGS. 1-33. The vault mounting fixture 300 is shown in FIG. 38 mounted within the vault 102. Referring to FIGS. 37 and 38, the vault mounting fixture 300 generally includes a can structure 302 coupled to a frame structure 304 and a bell jar cover 306 that is adapted to form an enclosure 308 with the can structure 302 to enclose the fiber optic telecommunications distribution system 100 of FIGS. 1-33. The bell jar cover 306 includes a top end 304 and a skirt portion 303 extending down from the top end 304. In FIG. 37, the underground vault mounting fixture 300 is shown with the bell jar cover 306 removed to expose the fiber optic telecommunications distribution system 100. The fiber optic telecommunications distribution system 100, including the base tray 106 is loaded into the can structure 302 and the skirt portion 303 of the bell jar cover 306 is slid into the can structure 302 around the fiber distribution system 100 to form a sealed enclosure 308 for the fiber distribution system 100. In FIG. 37, the fiber distribution system 100 is shown with coils of multi-fiber cable 132 extending from the bottom side 116 of the base tray 106. The coils of cable 132 that extends from the bottom of the base tray 106 is fed out of an opening 310 located at the bottom of the can structure 302. The opening 310 is provided with a water tight seal. As shown in FIGS. 37 and 38, the vault 102 is provided with cable entry ports 312 for splicing the cable coils 132 with outside plant cables.

Figures 39, 40:
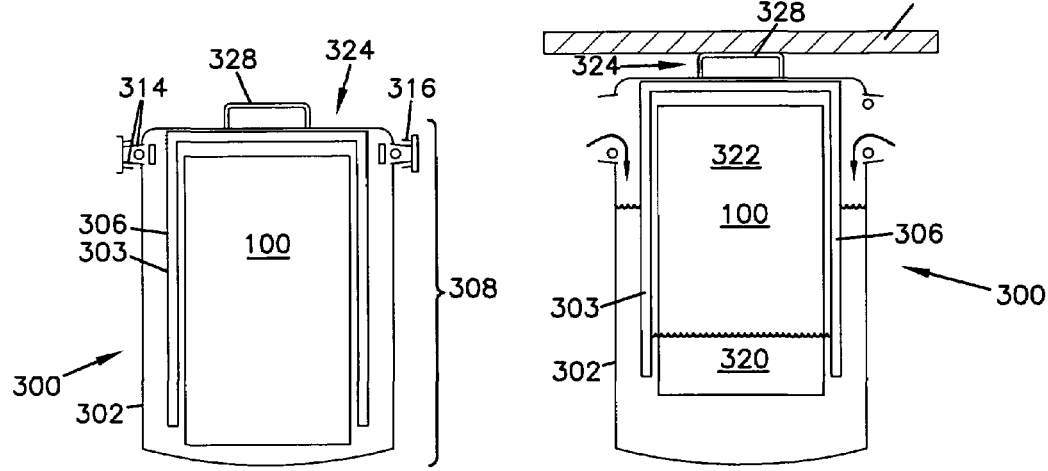
FIG. 39 is a cross sectional view taken along a line similar to line 38-38 of FIG. 37, the bottom can and the top bell jar of the underground vault mounting fixture shown in a sealed configuration.
FIG. 40 illustrates the orientation of the bottom can and the bell jar of FIG. 39 within the vault when the seal fails.

As shown in the cross-sectional view in FIG. 39, the fiber distribution system 100 is placed within the can structure 302 and the bell jar cover 306 is slid into the can 302 around the fiber distribution system 100. For simplicity of illustration, the fiber distribution system 100 is shown diagrammatically within the can structure 302. The bell jar 306 and the can structure 302 include abutting flanges 314 that are clamped with a V-clamp 316 and an O-ring for forming a water tight seal at the upper end 318 of the can 302. FIG. 40 illustrates the orientation of the can 302 and the bell jar cover 306 if the seal were to fail. As illustrated, if the seal fails, water 320 would fill into the can 302, lifting the bell jar cover 306 out of the can 302. The water 320 however would trap air 322 within the bell jar cover 306. In this manner, the splitter modules 130 of the fiber distribution system 100 would be protected from the water 320, even if the V-clamp 316 were to fail. As shown on FIG. 40, the water 320 within the can 302 would lift the bell jar 306 until the top end 324 of the bell jar 306 contacts the vault lid 326. Once the bell jar 306 contacts the vault lid 326, the bell jar 306 would be fixed in place, the trapped air 322 within the bell jar 306 protecting the inner components of the fiber distribution system 100. As depicted in FIG. 40, even if water is halfway up outside of the bell jar cover 306, the upper portions of the fiber distribution system 100 would be protected.

The configuration of the vault mounting fixture 300 facilitates servicing of the fiber distribution system 100. When access is required within the enclosure 308, the service person simply removes the vault lid 326, removes the bell jar cover 306 via the handle 328 and lifts the fiber distribution system 100 out of the can structure 302 to get access to the circuits.

Placing the access point (seal location) close to the top of the vault 102 reduces the risk of the fiber distribution system 100 to be flooded if any water was to flood the vault 102. Also, if the can 302 is desired to be removed from the vault 102 for any reason, since the can 302 is fixed in an elevated position within the vault 102, any ice that may form at the bottom of the vault 102 does not reach the can 302 and does not have to be thawed-out to remove the can 302.

The design of the vault mounting fixture 300 allows servicemen to remove the bell jar cover 306 and lift only the fiber distribution system 100 from the vault 102 when servicing. This configuration reduces the amount of weight that has to be handled by the servicemen and prevents having to resort to additional lifting mechanisms. Moreover, if a long enough slack spool of cable 132 is provided within the enclosure 308, the fiber distribution system 100 can be removed and taken to a service sight away from the vault 102 for splicing.

Figure 41:
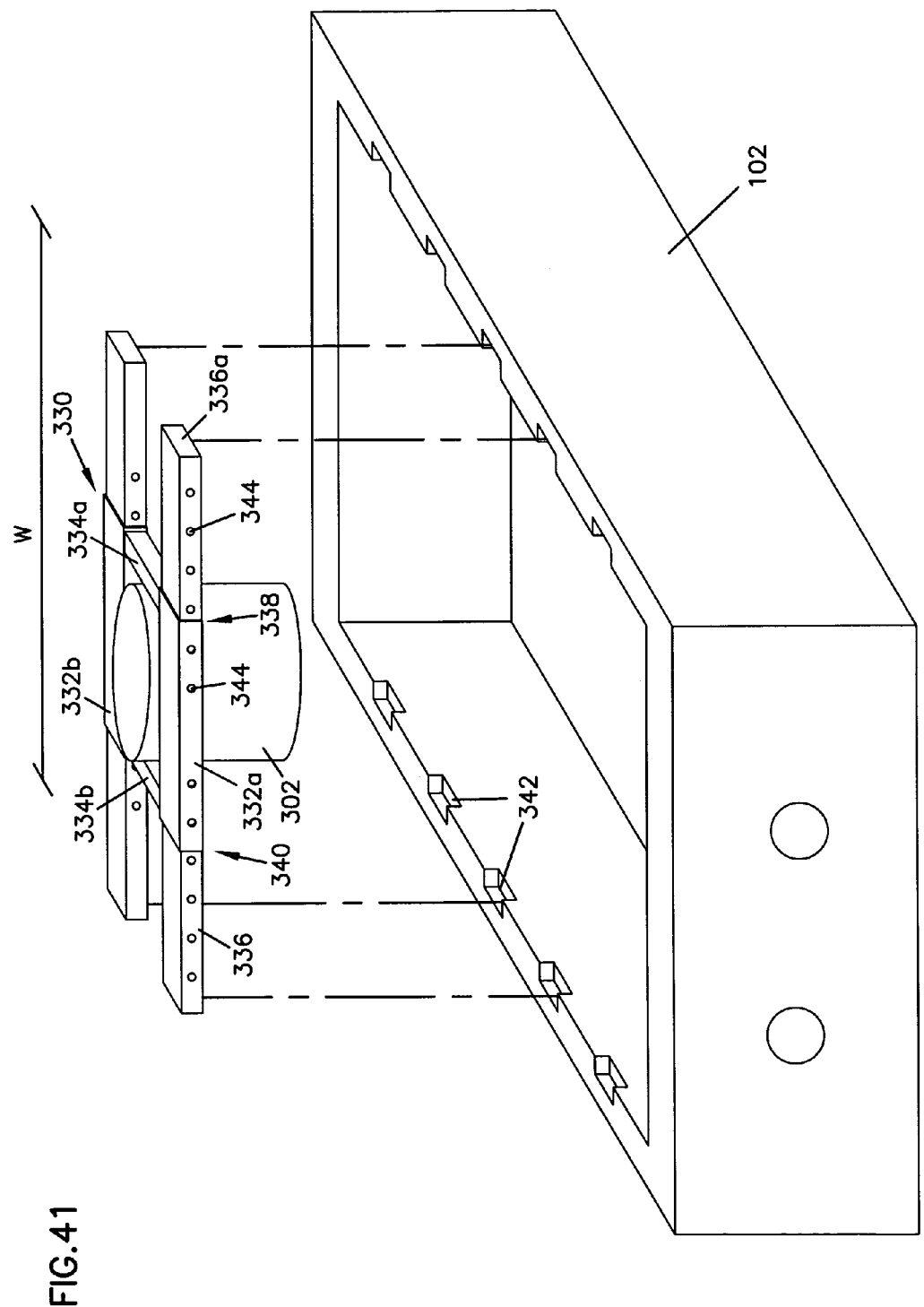
FIG. 41 illustrates a perspective view of an adjustable frame structure adapted for use with the underground vault mounting fixture of FIGS. 37-40.

FIG. 41 illustrates an adjustable frame structure 330 that is adapted for use with the underground vault mounting fixture 300 of FIGS. 37-40. The frame structure 330 is similar to the frame structure 304 shown in FIG. 37 except that the frame structure 330 features adjustability. The adjustable frame structure 330 generally includes a pair of center frame sections 332*a*, *b* (collectively referred to by 332) coupled together by a pair of cross-brackets 334*a*, *b* (collectively referred to by 334). The can 302 is coupled to the center frame sections 332 and the cross brackets 334 by being welded, bolted, or by other means. The center frame sections 332 include extendible leg sections 336 that fit within the center frame sections 332. A first extendible leg section 336*a* extends out of the first end 338 of the center frame section 332 and a second extendible leg section 336*b* extends out of the second end 340 of the center frame section 332. Each of the first and second extendible leg sections 336*a*, *b* are telescopingly slidable with respect to the center frame section 332. In this manner, either the width W of the frame structure 330 can be adjusted to fit different sized vaults or the vault mounting fixture 300 can be slid to different locations around the vault. The leg sections 336*a*, *b* are configured to fit within slots 342 formed around the vault edges.

As depicted in FIG. 41, the center frame sections 332 and the leg sections 336*a*, *b* may include discrete interlocking structures 344. The interlocking structures 344 may include slots and pins. Other types of interlock structures are also contemplated. In other certain embodiments, the leg sections 336*a*, *b* may have an infinite point of adjustability instead of discrete interlock points. Such continuous adjustment may be provided with clamps or other structures.

Figure 42A:
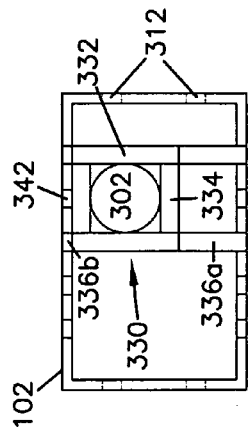
FIG. 42A illustrates a first position of the underground vault mounting fixture within the vault using the adjustable frame structure of FIG. 41.
Figure 42B:
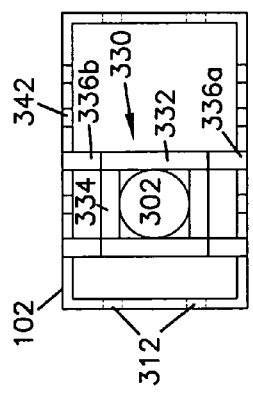
FIG. 42B illustrates a second position of the underground vault mounting fixture within the vault using the adjustable frame structure of FIG. 41.
Figure 42C:
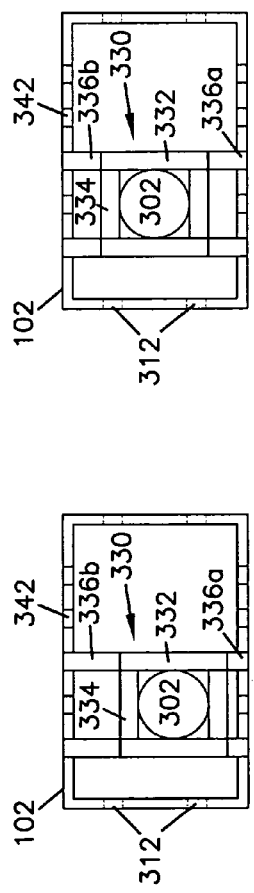
FIG. 42C illustrates a third position of the underground vault mounting fixture within the vault using the adjustable frame structure of FIG. 41.

As mentioned previously and as illustrated in FIGS. 42A-42C, the vault mounting fixture 300 can be mounted at different locations around the vault 102 by adjusting the relative extended lengths of the first and second leg sections 336*a*, *b*.

Figure 43A:
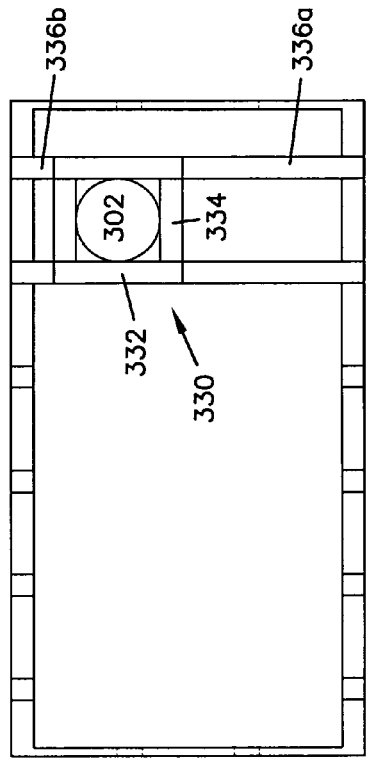
FIG. 43A illustrates a top view of the underground vault mounting fixture with the adjustable frame structure of FIG. 41 adjusted to fit in a larger size vault.
Figure 43B:
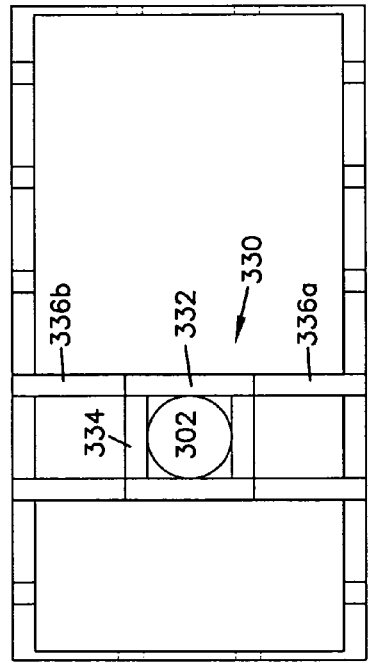
FIG. 43B illustrates a second position of the underground vault mounting fixture within the vault with the adjustable frame structure of FIG. 41 adjusted to fit in a larger size vault.

As depicted in FIG. 43A, the frame structure 330 is also adjustable to fit in different sized vaults. FIG. 43B illustrates both the size adjustability and the position adjustability features of the frame structure 330. It should be understood that the sections of the frame structure can be of various lengths and sizes depending on the desired use.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. An underground mounting fixture for mounting a piece of telecommunications equipment within a vault, the vault defining a closed bottom end positioned underground, an open top end accessible from street level, and a sidewall extending between the bottom end and the top end, the sidewall defining an upper peripheral edge of the open top end, the vault defining an opening for feeding cable into the vault, the mounting fixture comprising:

a frame structure configured to be mounted to the upper edge of the open end of the vault, the frame structure supporting the piece of telecommunications equipment within the vault, the frame structure comprising:

a center frame section including a first end and a second end;

two leg sections, one of the leg sections extending from the first end of the center frame section and the other one of the leg sections extending from the second end of the center frame section, the two leg sections constructed to fit into slots formed around the upper peripheral edge of the vault, each of the leg sections being configured to slidably telescope with respect to the center frame section to vary the size of the frame structure.

2. The mounting fixture according to claim 1, wherein the two legs are slidably received within the slots formed around the upper peripheral edge of the vault.

3. The mounting fixture according to claim 1, wherein the two legs cooperatively define a width of the frame structure, the width of the frame structure corresponding to a width of the vault, wherein the legs are slidable with respect to the center frame section such that the center frame section can be mounted at different locations along the width of the vault.

4. The mounting fixture according to claim 1, wherein the center frame section and the two leg sections include discrete interlocking structures for fixing the size of the frame structure.

5. The mounting fixture according to claim 3, wherein the center frame section and the two leg sections include discrete interlocking structures for fixing the location of the center frame section along the width of the vault.

6. The mounting fixture according to claim 4, wherein the interlocking structures include pin slots.

7. The mounting fixture according to claim 5, wherein the interlocking structures include pin slots.

* * * * *

UNITED STATES PATENT AND TRADEMARK OFFICE
CERTIFICATE OF CORRECTION

| | | |
|---|---|---|
| PATENT NO. | : 7,483,617 B2 | Page 1 of 1 |
| APPLICATION NO. | : 12/008924 | |
| DATED | : January 27, 2009 | |
| INVENTOR(S) | : Barth | |

It is certified that error appears in the above-identified patent and that said Letters Patent is hereby corrected as shown below:

Col. 9, lines 29-31: "FIBER OPTIC SPLITTER MODULE and FIBER OPTIC ADAPTER MODULE, being filed on the same date as the present application," should read --FIBER OPTIC SPLITTER MODULE (Serial No. 11/138,063, filed May 25, 2005) and FIBER OPTIC ADAPTER MODULE (Serial No. 11/138,889, filed May 25, 2005),--

Col. 9, lines 65-66: "FIBER OPTIC SERVICE BLOCKER, being filed on the same date as the present application," should read --FIBER SERVICE BLOCKER (Serial No. 11/138,667, filed May 25, 2005),--

Signed and Sealed this
Eighteenth Day of January, 2011

David J. Kappos
*Director of the United States Patent and Trademark Office*